(12) United States Patent
Ishibashi et al.

(10) Patent No.: US 7,693,593 B2
(45) Date of Patent: Apr. 6, 2010

(54) PRODUCTION PLANNING METHOD AND PRODUCTION PLANNING SYSTEM

(75) Inventors: Hisaya Ishibashi, Kanagawa (JP);
Noboru Takizawa, Kanagawa (JP);
Chiharu Nakagome, Kanagawa (JP);
Jun Tateishi, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 457 days.

(21) Appl. No.: 11/732,953

(22) Filed: Apr. 4, 2007

(65) Prior Publication Data
US 2007/0244591 A1 Oct. 18, 2007

(30) Foreign Application Priority Data
Apr. 4, 2006 (JP) .............................. 2006-102805

(51) Int. Cl.
*G06F 19/00* (2006.01)
(52) U.S. Cl. .......................................... 700/97; 700/52
(58) Field of Classification Search .................. 700/97, 700/99, 95, 32, 52
See application file for complete search history.

(56) References Cited
FOREIGN PATENT DOCUMENTS
JP 11-282824 10/1999

*Primary Examiner*—Paul L Rodriguez
*Assistant Examiner*—Nathan Laughlin
(74) *Attorney, Agent, or Firm*—Townsend and Townsend and Crew LLP; Darren Gold

(57) ABSTRACT

Embodiments of the present invention provide a production planning method and system. Where a manufacturing apparatus is shared by a plurality of products in a production line, if a manufacturing (production) availability number is changed, a cause parameter is automatically investigated so that a production plan with high precision can be prepared in a short time. With respect to a production plan as the previous/current comparison objects, a production process used in the production plan in which a change occurs, is extracted. From the production process, a parameter item to be used in the production capacity evaluation is extracted for all products, a difference comparison is made between the value of the previous parameter and the value of the current parameter, so that the parameter item as the cause is specified. The combination of the cause parameter items is calculated, and a cause parameter list is prepared. Next, from the specified parameter list, the parameter item is sequentially changed, and the manufacturing (production) availability number is recalculated. An influence index given to the manufacturing (production) unavailability number by the cause parameter, is calculated.

12 Claims, 25 Drawing Sheets

Fig. 6

| PRODUCT NUMBER | PLANNING DAY | COMPLETION SCHEDULED DAY | MANUFACTURING (PRODUCTION) AVAILABILITY NUMBER |
|---|---|---|---|
| PRODUCT A | MARCH 1 | APRIL 25 | 100 |
| PRODUCT A | MARCH 1 | APRIL 26 | 100 |
| PRODUCT A | MARCH 1 | APRIL 27 | 100 |
| PRODUCT A | MARCH 1 | APRIL 28 | 100 |
| PRODUCT A | MARCH 1 | APRIL 29 | 100 |
| PRODUCT A | MARCH 1 | APRIL 30 | 100 |
| PRODUCT A | MARCH 1 | MAY 1 | 100 |
| PRODUCT A | MARCH 8 | APRIL 25 | 100 |
| PRODUCT A | MARCH 8 | APRIL 26 | 90 |
| PRODUCT A | MARCH 8 | APRIL 27 | 100 |
| PRODUCT A | MARCH 8 | APRIL 28 | 100 |
| PRODUCT A | MARCH 8 | APRIL 29 | 100 |
| PRODUCT A | MARCH 8 | APRIL 30 | 100 |
| PRODUCT A | MARCH 8 | MAY 1 | 100 |

Fig. 7

| PRODUCT NUMBER | PLANNING DAY | PRODUCTION LINE | DATE | YIELD |
|---|---|---|---|---|
| PRODUCT A | MARCH 1 | PART ASSEMBLY 1 | APRIL 26 | 90% |
| PRODUCT A | MARCH 1 | PRODUCT ASSEMBLY 1 | APRIL 26 | 90% |
| PRODUCT A | MARCH 1 | TEST PROCESS 1 | APRIL 26 | 90% |
| PRODUCT A | MARCH 1 | FINAL ASSEMBLY 1 | APRIL 26 | 90% |
| PRODUCT B | MARCH 1 | PART ASSEMBLY 2 | APRIL 26 | 90% |
| PRODUCT B | MARCH 1 | PRODUCT ASSEMBLY 2 | APRIL 26 | 90% |
| PRODUCT B | MARCH 1 | TEST PROCESS 2 | APRIL 26 | 90% |
| PRODUCT B | MARCH 1 | FINAL ASSEMBLY 1 | APRIL 26 | 90% |
| PRODUCT A | MARCH 8 | PART ASSEMBLY 1 | APRIL 26 | 90% |
| PRODUCT A | MARCH 8 | PRODUCT ASSEMBLY 1 | APRIL 26 | 90% |
| PRODUCT A | MARCH 8 | TEST PROCESS 1 | APRIL 26 | 90% |
| PRODUCT A | MARCH 8 | FINAL ASSEMBLY 1 | APRIL 26 | 84% |
| PRODUCT B | MARCH 8 | PART ASSEMBLY 2 | APRIL 26 | 90% |
| PRODUCT B | MARCH 8 | PRODUCT ASSEMBLY 2 | APRIL 26 | 90% |
| PRODUCT B | MARCH 8 | TEST PROCESS 2 | APRIL 26 | 90% |
| PRODUCT B | MARCH 8 | FINAL ASSEMBLY 1 | APRIL 26 | 84% |

Fig. 8

| PRODUCT NUMBER | PLANNING DAY | REQUEST DAY | COMPLETION REQUEST AMOUNT |
|---|---|---|---|
| PRODUCT A | MARCH 8 | APRIL 25 | 100 |
| PRODUCT B | MARCH 8 | APRIL 25 | 100 |
| PRODUCT A | MARCH 8 | APRIL 26 | 100 |
| PRODUCT B | MARCH 8 | APRIL 26 | 100 |
| PRODUCT A | MARCH 8 | APRIL 27 | 100 |
| PRODUCT B | MARCH 8 | APRIL 27 | 100 |
| PRODUCT A | MARCH 8 | APRIL 28 | 100 |
| PRODUCT A | MARCH 8 | APRIL 28 | 100 |

Fig. 9

| PRODUCT NUMBER | PRODUCTION LINE |
|---|---|
| PRODUCT A | PART ASSEMBLY 1 |
| PRODUCT A | PRODUCT ASSEMBLY 1 |
| PRODUCT A | TEST PROCESS 1 |
| PRODUCT A | FINAL ASSEMBLY 1 |
| PRODUCT B | PART ASSEMBLY 2 |
| PRODUCT B | PRODUCT ASSEMBLY 2 |
| PRODUCT B | TEST PROCESS 2 |
| PRODUCT B | FINAL ASSEMBLY 1 |

Fig. 10

| PRODUCT NUMBER | PLANNING DAY | PRODUCTION LINE | DATE | TIME (SECOND/ PIECE) |
|---|---|---|---|---|
| PRODUCT A | MARCH 8 | PART ASSEMBLY 1 | APRIL 26 | 100 |
| PRODUCT A | MARCH 8 | PRODUCT ASSEMBLY 1 | APRIL 26 | 540 |
| PRODUCT A | MARCH 8 | TEST PROCESS 1 | APRIL 26 | 200 |
| PRODUCT A | MARCH 8 | FINAL ASSEMBLY 1 | APRIL 26 | 540 |
| PRODUCT B | MARCH 8 | PART ASSEMBLY 2 | APRIL 26 | 150 |
| PRODUCT B | MARCH 8 | PRODUCT ASSEMBLY 2 | APRIL 26 | 480 |
| PRODUCT B | MARCH 8 | TEST PROCESS 2 | APRIL 26 | 360 |
| PRODUCT B | MARCH 8 | FINAL ASSEMBLY 1 | APRIL 26 | 720 |

Fig. 11

| PRODUCT NUMBER | PLANNING DAY | REQUEST DAY | PRIORITY |
|---|---|---|---|
| PRODUCT A | MARCH 8 | APRIL 25 | 2 |
| PRODUCT B | MARCH 8 | APRIL 25 | 1 |
| PRODUCT A | MARCH 8 | APRIL 26 | 2 |
| PRODUCT B | MARCH 8 | APRIL 26 | 1 |
| PRODUCT A | MARCH 8 | APRIL 27 | 2 |
| PRODUCT B | MARCH 8 | APRIL 27 | 1 |
| PRODUCT A | MARCH 8 | APRIL 28 | 2 |
| PRODUCT A | MARCH 8 | APRIL 28 | 1 |

Fig. 12

| PRODUCTION LINE | PLANNING DAY | DATE | MANUFACTURING (PRODUCTION) TOOL AVAILABILITY TIME (SECOND) |
|---|---|---|---|
| PART ASSEMBLY 1 | MARCH 8 | APRIL 26 | 75000 |
| PRODUCT ASSEMBLY 1 | MARCH 8 | APRIL 26 | 75000 |
| TEST PROCESS 1 | MARCH 8 | APRIL 26 | 75000 |
| FINAL ASSEMBLY 1 | MARCH 8 | APRIL 26 | 175088 |
| PART ASSEMBLY 2 | MARCH 8 | APRIL 26 | 75000 |
| PRODUCT ASSEMBLY 2 | MARCH 8 | APRIL 26 | 75000 |
| TEST PROCESS 2 | MARCH 8 | APRIL 26 | 75000 |

Fig. 13

| PLANNING DAY | PRODUCTION LINE | DATE | WORKING RATIO |
|---|---|---|---|
| MARCH 1 | PART ASSEMBLY 1 | APRIL 26 | 0.9 |
| MARCH 1 | PRODUCT ASSEMBLY 1 | APRIL 26 | 0.9 |
| MARCH 1 | TEST PROCESS 1 | APRIL 26 | 0.9 |
| MARCH 1 | FINAL ASSEMBLY 1 | APRIL 26 | 0.8 |
| MARCH 1 | PART ASSEMBLY 2 | APRIL 26 | 0.9 |
| MARCH 1 | PRODUCT ASSEMBLY 2 | APRIL 26 | 0.9 |
| MARCH 1 | TEST PROCESS 2 | APRIL 26 | 0.9 |
| MARCH 8 | PART ASSEMBLY 1 | APRIL 26 | 0.9 |
| MARCH 8 | PRODUCT ASSEMBLY 1 | APRIL 26 | 0.9 |
| MARCH 8 | TEST PROCESS 1 | APRIL 26 | 0.9 |
| MARCH 8 | FINAL ASSEMBLY 1 | APRIL 26 | 0.82 |
| MARCH 8 | PART ASSEMBLY 2 | APRIL 26 | 0.9 |
| MARCH 8 | PRODUCT ASSEMBLY 2 | APRIL 26 | 0.9 |
| MARCH 8 | TEST PROCESS 2 | APRIL 26 | 0.9 |

Fig. 14

| PRODUCT NUMBER | COMPLETION SCHEDULED DAY | PARAMETER | CAUSE PRODUCT | CAUSE PRODUCTION LINE | DATE | INFLUENCE INDEX |
|---|---|---|---|---|---|---|
| PRODUCT A | APRIL 26 | YIELD | PRODUCT B | | APRIL 26 | 90% |
| PRODUCT A | APRIL 26 | YIELD | PRODUCT A | | APRIL 26 | 70% |
| PRODUCT A | APRIL 26 | WORKING RATIO | | FINAL ASSEMBLY 1 | APRIL 26 | -60% |

Fig. 21

| ITEM | PRODUCT | INFLUENCE INDEX |
|---|---|---|
| YIELD | B | 90% |
| YIELD | A | 70% |
| WORKING RATIO | FINAL ASSEMBLY 1 | -60% |

| ITEM | DATE | PRODUCT | MEASURE |
|---|---|---|---|
| PRIORITY COUNTERMEASURE | 4/26 | B | 1→2 |
| COMPLETION REQUEST AMOUNT COUNTERMEASURE | 4/26 | B | 100→92 |
| WORKING RATIO COUNTERMEASURE | 4/26 | FINAL ASSEMBLY 1 | 82%→86% |

Fig. 26

(a) PLANNING DAY MARCH 1, DATE APRIL 26, PRODUCT B, PRIORITY 1, COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 2 | 150 | 90% | 90% | 18519 | 75000 | 56481 | 100 |
| PRODUCT ASSEMBLY 2 | 480 | 90% | 90% | 59259 | 75000 | 15741 | 100 |
| TEST PROCESS 2 | 360 | 90% | 90% | 44444 | 75000 | 30556 | 100 |
| FINAL ASSEMBLY 1 | 720 | 90% | 80% | 100000 | 175088 | 75088 | 100 |

(b) PLANNING DAY MARCH 1, DATE APRIL 26, PRODUCT A, PRIORITY 2, COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 1 | 100 | 90% | 90% | 12346 | 75000 | 62654 | 100 |
| PRODUCT ASSEMBLY 1 | 540 | 90% | 90% | 66667 | 75000 | 8333 | 100 |
| TEST PROCESS 1 | 200 | 90% | 90% | 24691 | 75000 | 50309 | 100 |
| FINAL ASSEMBLY 1 | 540 | 90% | 80% | 75000 | 75088 | 88 | 100 |

Fig. 27

(a) PLANNING DAY MARCH 8. DATE APRIL 26. PRODUCT B. PRIORITY 1. COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 2 | 150 | 84% | 90% | 19841 | 75000 | 55159 | 100 |
| PRODUCT ASSEMBLY 2 | 480 | 84% | 90% | 63492 | 75000 | 11508 | 100 |
| TEST PROCESS 2 | 360 | 84% | 90% | 47619 | 75000 | 27381 | 100 |
| FINAL ASSEMBLY 1 | 720 | 84% | 82% | 104530 | 175088 | 70558 | 100 |

(b) PLANNING DAY MARCH 1. DATE APRIL 26. PRODUCT A. PRIORITY 2. COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 1 | 100 | 84% | 90% | 13228 | 75000 | 61772 | 100 |
| PRODUCT ASSEMBLY 1 | 540 | 84% | 90% | 71429 | 75000 | 3571 | 100 |
| TEST PROCESS 1 | 200 | 84% | 90% | 26455 | 75000 | 48545 | 100 |
| FINAL ASSEMBLY 1 | 540 | 84% | 82% | 78397 | 70558 | -7839 | 90 |

Fig. 28

(a) PLANNING DAY MARCH 8. DATE APRIL 26. PRODUCT B. PRIORITY 1. COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 2 | 150 | 90% | 90% | 18519 | 75000 | 56481 | 100 |
| PRODUCT ASSEMBLY 2 | 480 | 90% | 90% | 59259 | 75000 | 15741 | 100 |
| TEST PROCESS 2 | 360 | 90% | 90% | 44444 | 75000 | 30556 | 100 |
| FINAL ASSEMBLY 1 | 720 | 84% | 80% | 107143 | 175088 | 67945 | 100 |

(b) PLANNING DAY MARCH 8. DATE APRIL 26. PRODUCT A. PRIORITY 2. COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 1 | 100 | 90% | 90% | 12346 | 75000 | 62654 | 100 |
| PRODUCT ASSEMBLY 1 | 540 | 90% | 90% | 66667 | 75000 | 8333 | 100 |
| TEST PROCESS 1 | 200 | 90% | 90% | 24691 | 75000 | 50309 | 100 |
| FINAL ASSEMBLY 1 | 540 | 90% | 80% | 75000 | 67945 | -7055 | 91 |

Fig. 29

(a) PLANNING DAY MARCH 8, DATE APRIL 26, PRODUCT B, PRIORITY 1, COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 2 | 150 | 90% | 90% | 18519 | 75000 | 56481 | 100 |
| PRODUCT ASSEMBLY 2 | 480 | 90% | 90% | 59259 | 75000 | 15741 | 100 |
| TEST PROCESS 2 | 360 | 90% | 90% | 44444 | 75000 | 30556 | 100 |
| FINAL ASSEMBLY 1 | 720 | 90% | 80% | 100000 | 175088 | 75088 | 100 |

(b) PLANNING DAY MARCH 8, DATE APRIL 26, PRODUCT A, PRIORITY 2, COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 1 | 100 | 90% | 90% | 12346 | 75000 | 62654 | 100 |
| PRODUCT ASSEMBLY 1 | 540 | 90% | 90% | 66667 | 75000 | 8333 | 100 |
| TEST PROCESS 1 | 200 | 90% | 90% | 24691 | 75000 | 50309 | 100 |
| FINAL ASSEMBLY 1 | 540 | 84% | 80% | 80357 | 75088 | -5269 | 93 |

Fig. 30

(a) PLANNING DAY MARCH 8. DATE APRIL 26. PRODUCT B. PRIORITY 1. COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 2 | 150 | 90% | 90% | 18519 | 75000 | 56481 | 100 |
| PRODUCT ASSEMBLY 2 | 480 | 90% | 90% | 59259 | 75000 | 15741 | 100 |
| TEST PROCESS 2 | 360 | 90% | 90% | 44444 | 75000 | 30556 | 100 |
| FINAL ASSEMBLY 1 | 720 | 90% | 82% | 97561 | 175088 | 77527 | 100 |

(b) PLANNING DAY MARCH 8. DATE APRIL 26. PRODUCT A. PRIORITY 2. COMPLETION REQUEST NUMBER 100

| PRODUCT NUMBER | TIME (SECOND /PIECE) | YIELD | WORKING RATIO | NECESSARY PRODUCTION WORKING TIME (SECOND) | SUPPLIABLE TIME (SECOND) | REMAINING SUPPLIABLE TIME(SECOND) | PROCESS-SPECIFIC MANUFACTURING (PRODUCTION) AVAILABILITY NUMBER |
|---|---|---|---|---|---|---|---|
| PART ASSEMBLE 1 | 100 | 90% | 90% | 12346 | 75000 | 62654 | 100 |
| PRODUCT ASSEMBLY 1 | 540 | 90% | 90% | 66667 | 75000 | 8333 | 100 |
| TEST PROCESS 1 | 200 | 90% | 90% | 24691 | 75000 | 50309 | 100 |
| FINAL ASSEMBLY 1 | 540 | 90% | 82% | 73171 | 77527 | 4356 | 106 |

# PRODUCTION PLANNING METHOD AND PRODUCTION PLANNING SYSTEM

CROSS-REFERENCE TO RELATED APPLICATION

The instant nonprovisional patent application claims priority to Japanese Application No. 2006-102805, filed Apr. 4, 2006 and incorporated by reference in its entirety herein for all purposes.

BACKGROUND OF THE INVENTION

In manufacturing industries in which a product lifecycle becomes short and the market change is vigorous, it is important to organize the production planning work capable of quickly meeting a customer's request.

In the production planning work, the production plan of specifying when and where each product is produced and how many products are produced is prepared at intervals of months or weeks, and this result is provided for the work in which the material procurement or manufacturing instruction is performed.

However, in the production planning work, in the case where even in the same product, a change occurs in multiple input information, or in the case where a manufacturing machine is shared by multiple products, since it is uncertain which input information influences which production planning result, for example, as disclosed in Japanese Patent Application No. JP-A-11-282824 ("patent document 1"), operations of (1) calculation of a manufacturing (production) availability number, (2) comparison of the previous/current manufacturing (production) availability numbers, and (3) recalculation of a manufacturing (production) availability number after input information correction have been repeatedly performed.

As disclosed in the patent document 1, since the operations of (1), (2) and (3) are repeated until a satisfactory production plan is obtained, it takes much time, and a practical production planning preparation work can not be performed. In particular, there has been a serious problem in a production line in which customer demand is frequently changed, a change in yield of the production line is vigorous, and a manufacturing process routing is complicated.

BRIEF SUMMARY OF THE INVENTION

Embodiments of the present invention provide a production planning method and system. Where a manufacturing apparatus is shared by a plurality of products in a production line, if a manufacturing (production) availability number is changed, a cause parameter is automatically investigated so that a production plan with high precision can be prepared in a short time. With respect to a production plan as the previous/current comparison objects, a production process used in the production plan in which a change occurs, is extracted. From the production process, a parameter item to be used in the production capacity evaluation is extracted for all products, a difference comparison is made between the value of the previous parameter and the value of the current parameter, so that the parameter item as the cause is specified. The combination of the cause parameter items is calculated, and a cause parameter list is prepared. Next, from the specified parameter list, the parameter item is sequentially changed, and the manufacturing (production) availability number is recalculated. An influence index given to the manufacturing (production) unavailability number by the cause parameter, is calculated.

BRIEF DESCRIPTION OF THE DRAWINGS

FIG. 6 is a view showing an embodiment of manufacturing (production) availability number information according to the present invention.

FIG. 7 is a view showing an embodiment of yield information according to the present invention.

FIG. 8 is a view showing an embodiment of completion request amount information according to the present invention.

FIG. 9 is a view showing an embodiment of production process information (production line information) according to the present invention.

FIG. 10 is a view showing an embodiment of production capacity master information according to the present invention.

FIG. 11 is a view showing an embodiment of priority information according to the present invention.

FIG. 12 is a view showing an embodiment of manufacturing(production) tool availability time information according to the present invention.

FIG. 13 is a view showing an embodiment of working ratio information according to the present invention.

FIG. 14 is a view showing an embodiment of influence evaluation index information given to a manufacturing (production) unavailability number by a cause parameter according to the present invention.

FIG. 21 is a view showing an influence index over specified cause parameter items according to embodiments of the present invention.

FIGS. 26(a) and 26(b) are views showing a necessary production working time on March 1 of the previous planning day, a suppliable time, a remaining suppliable time, a process-specific manufacturing (production) availability number and the like in the production plan according to embodiments of the present invention.

FIGS. 27(a) and 27(b) are views showing a necessary production working time on March 8 of the current planning day, a suppliable time, a remaining suppliable time, a process-specific manufacturing (production) availability number and the like in the production plan according to the invention.

FIGS. 28(a) and 28(b) are explanatory views in which as shown in FIG. 18, in the production plan according to embodiments of the present invention, the calculation result (91) of the recalculated manufacturing (production) availability number is obtained.

FIGS. 29(a) and 29(b) are explanatory views in which as shown in FIG. 19, in the production plan according to embodiments of the present invention, the calculation result (93) of the recalculated manufacturing (production) availability number is obtained.

FIGS. 30(a) and 30(b) are explanatory views in which as shown in FIG. 20, in the production plan according to embodiments of the present invention, the calculation result (106) of the recalculated manufacturing (production) availability number is obtained.

DETAILED DESCRIPTION OF THE INVENTION

Figure 1:
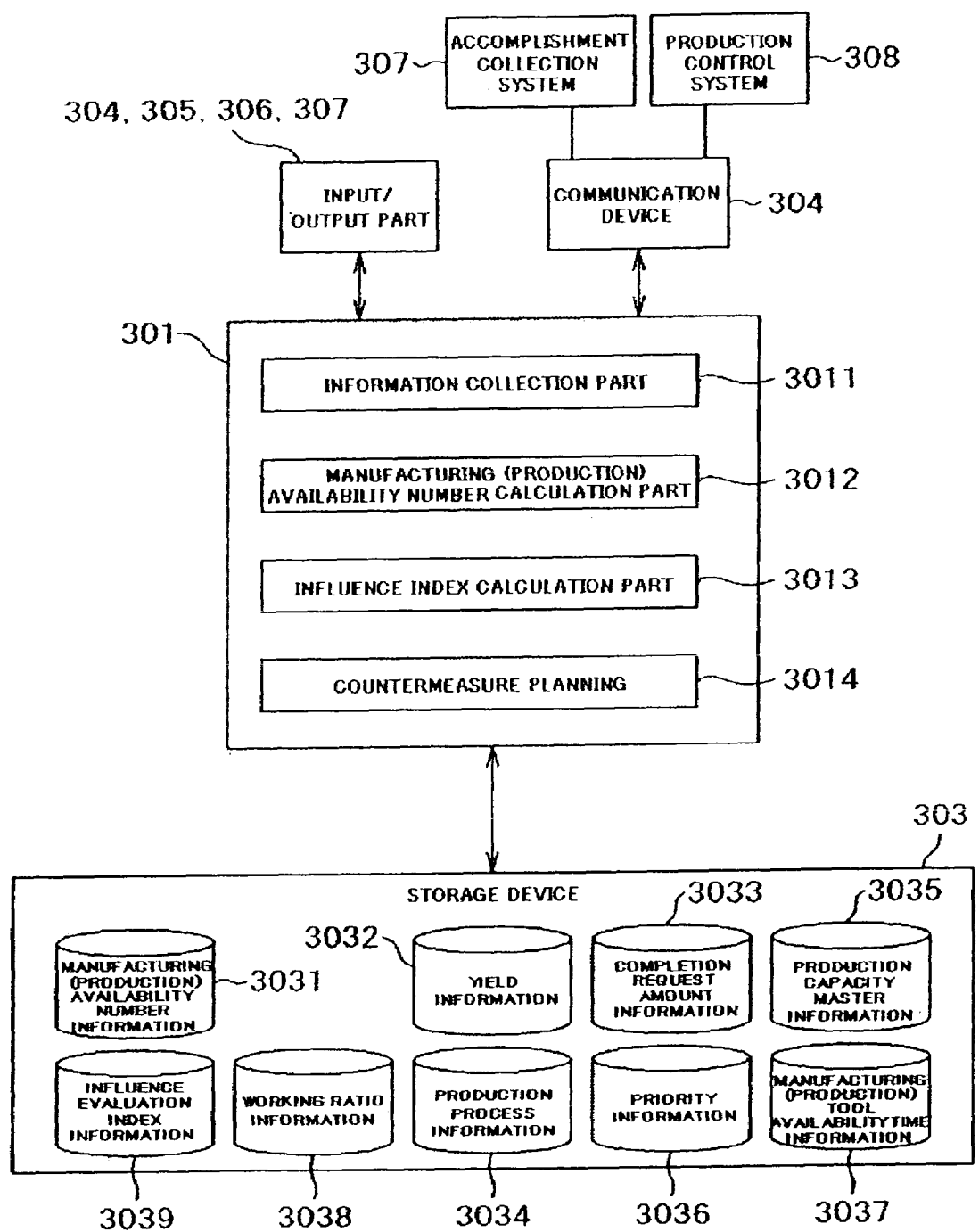
FIG. 1 is a schematic functional structural view showing an embodiment of a production planning system (including a processing program) having a production capacity evaluation function to execute a cause investigating method of a manufacturing (production) unavailability number according to embodiments of the present invention.

In order to solve the problems described above, an object of embodiments of the present invention is to provide a production planning method and a production planning system in which in a production line in a case where a manufacturing machine is shared by a plurality of products, a cause parameter, in a case where a production plan is changed, is automatically investigated so that a production plan with high precision can be prepared in a short time.

Embodiments in accordance with the present invention relate to a production planning method and a production planning system in which in a production planning preparation work to extract a cause parameter item of a production impossibility number by using production capacity evaluation calculation, a production plan with high precision is prepared in a short time.

In order to achieve an objective of the present invention, a production planning method and its system for extracting a cause parameter item of a manufacturing (production) unavailability number by using production capacity evaluation calculation is characterized by including a production capacity evaluation step of calculating a previous manufacturing (production) availability number of a previous production plan and a current manufacturing (production) availability number of a current production plan by using the production capacity evaluation calculation for each request day and each product, an object production line extraction step of extracting a production line of an object to be used in a production plan of a product in which a change occurs by comparing the previous manufacturing (production) availability number with the current manufacturing (production) availability number for each request day and each product calculated at the production capacity evaluation step, a parameter item extraction step of extracting, from the production line extracted at the object production line extraction step, a parameter item to be used in the production capacity evaluation calculation with respect to all products, a cause parameter list creation step of specifying a parameter item as a cause by difference at a time of previous production planning with data at a time of current production planning for each parameter item extracted at the parameter item extraction step and listing the specified cause parameter item, a recalculation step of recalculating a manufacturing (production) availability number k for each of the specified cause parameter items by using the production capacity evaluation calculation and by, based on the cause parameter list created at the cause parameter list creation step, sequentially changing cause parameter items other than the specified cause parameter item to data at the time of the previous production planning and inputting data at the time of the current production planning with respect to the specified cause parameter item, and an influence index calculation step of calculating an influence index k given to the manufacturing (production) unavailability number by the specified cause parameter item k based on a following expression (1) and based on the manufacturing (production) availability number k of each of the specified cause parameter items recalculated at the recalculation step.

influence index $k$=(previous manufacturing (production) availability number−manufacturing (production) availability number $k$)/(previous manufacturing (production) availability number−current manufacturing (production) availability number) (1)

(where, k denotes an argument of the cause parameter list)

Embodiments of the present invention are characterized in that at the influence index calculation step, the calculated influence index k is displayed on a display device.

Embodiments of the present invention are characterized by including a action planning step of making a countermeasure by correcting the data at the time of the current production planning with respect to the specified cause parameter item having a large influence index k among influence indexes k calculated at the influence index calculation step. That is, the feature is that at the countermeasure planning step, a countermeasure list is presented in descending order of influence index, and as the need arises, input information is changed based on the influence index, and the production plan is again formed.

Embodiments of the present invention are characterized in that at the production capacity evaluation step, the previous manufacturing (production) availability number and the current manufacturing (production) availability number calculated for each request day and each product are displayed on the display device.

Embodiments of the present invention are characterized in that at the cause parameter list creation step, the listed and specified cause parameter item is displayed on the display device.

According to embodiments of the present invention, in the production planning operation for the production line in which the change in the demand from the customer is vigorous, the change in the yield of the production line is vigorous, and the production process passage is complicated, it becomes possible to decrease the formation of a plan and the comparison between the previous/current manufacturing (production) availability numbers, and the production plan with high precision can be prepared in a short time.

Hereinafter, an embodiment of the invention will be described by use of the drawings.

Figure 2:
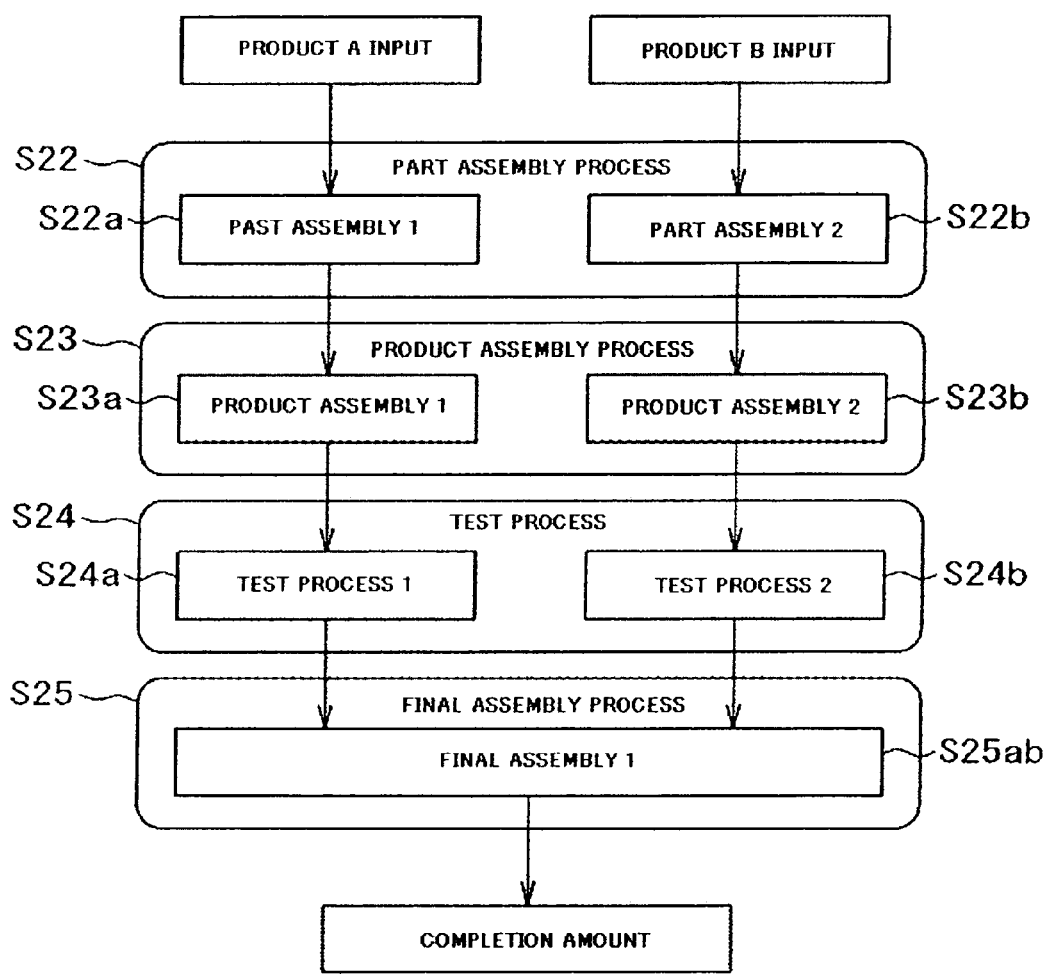
FIG. 2 is a schematic view of a process flow of a production line as an object of an embodiment of the present invention.

FIG. 2 is a schematic view for plainly explaining an embodiment of a manufacture process according to the present invention. In this embodiment, a description will be given to a manufacture process of a hard disk. The manufacture process of the hard disk as an object of the present invention includes a part assembly process of stacking a plurality of magnetic heads as main parts to form an intermediate part (S22), a product assembly process of assembling it, together with parts, such as a disk, a spindle motor, and a frame, to a housing (S23), a test process of performing final fair quality judgment (S24), and a final assembly process of finally assembling a circuit board and a cover portion of the housing (S25). Each of the processes includes a plurality of lines. The part assembly process (S22) includes, for example, a "part assembly 1" line in which parts constituting a product A are put (S22a), and a "part assembly 2" line in which parts constituting a product B are put (S22b). In this embodiment, with respect to the product A and the product B as two kinds of hard disk products, the product A includes the "part assembly 1" line (S22a), a "product assembly 1" line (S23a), a "test process 1" line (S24a) and a "final assembly 1" line (S25ab), and the product B includes the "part assembly 2" line (S22b), a "product assembly 2" line (S23b), a "test process 2" line (S24b) and the "final assembly 1" line (S25ab), and the production line has only the "final assembly 1" line as a shared line.

Figure 3:
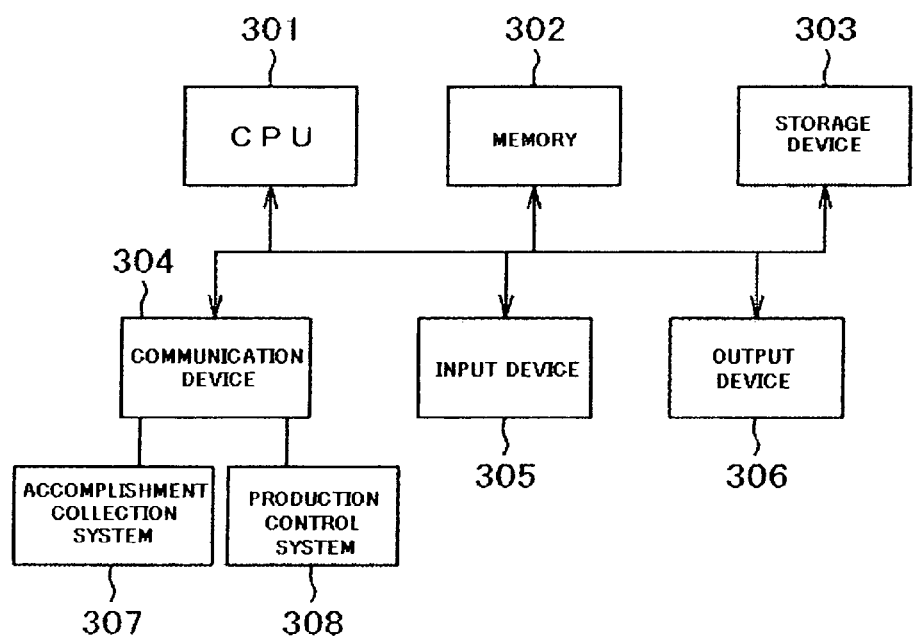
FIG. 3 is a hard structural view showing the embodiment of the production planning system having the production capacity evaluation function to execute the cause investigating method of the manufacturing (production) unavailability number according to the present invention.
Figure 4:
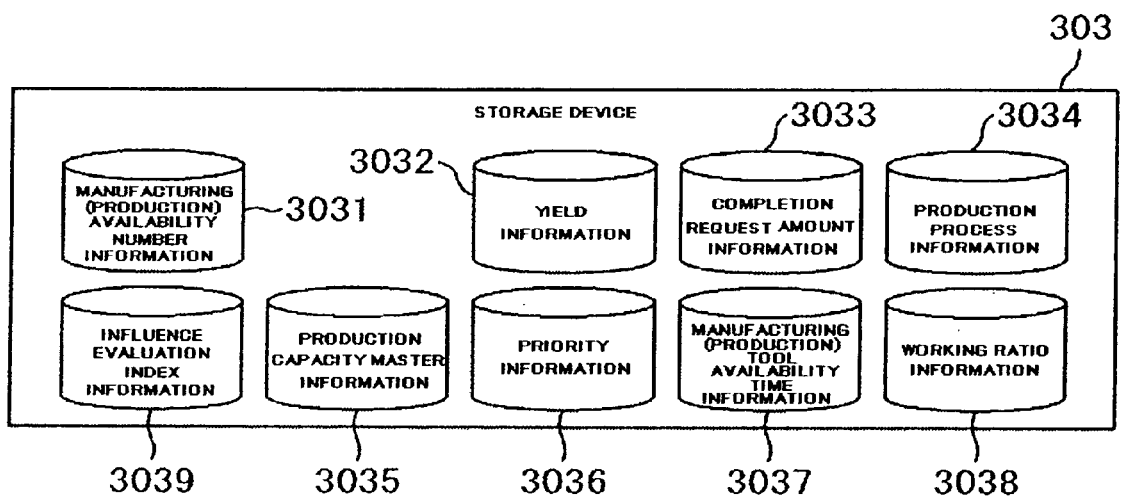
FIG. 4 is a view showing various information stored in a storage device shown in FIG. 1 and FIG. 3.

Next, the production planning system having a production capacity evaluation function to execute a cause investigating method of a manufacturing (production) unavailability number according to embodiments of the present invention is a computer system having a general structure which includes, as shown in FIG. 3, for example, a CPU (301), a memory (302), a storage device (303), such as a hard disk device, storing various information, an input device (305) such as a keyboard or a mouse, an output device (306), such as a CRT or an LCD, to display a cause parameter list, a screen of a production planning result, an influence index to a parameter pattern Pi, and the like, a communication device (304) to communicate with an accomplishment collection system (307) and a production control system (308) through a network such as the Internet, and a bus to connect these devices, or can be configured by a network system including such a plurality of computer systems.

The manufacturing data collection system (307) collects information of yield for each of the kinds of the products (for example, A, B) from, for example, the respective test processes 1 and 2, and collects information of a working ratio of each of the production lines and provides them to the production capacity evaluation system (production planning system) (301) through the communication device (304), and they are stored in yield information (3032) and working ratio information (3038) of the storage device (303). Of course, order information from customers, yield information of each product and each production line, and working ratio information of each production line may be collected in the information collection part (3011) in the processing part (301).

In the production planning system according to embodiments of the present invention, the order information from customers inputted through, for example, the communication device 304 is obtained as a completion request amount for a request day and for each product, and is stored into an order information (completion request amount information) (3033) of the storage device (303). Each record registered in the order information (completion request amount information) (3033) includes, as shown in FIG. 8, a field for registration of a product number as an identification number of a final assembly, a field (not shown) for registration of a planning day, a field for registration of a completion request day, and a field for registration of a numerical quantity (completion request amount) to be shipped until the request day. Besides, the planning day is the day when the manufacturing (production) availability number is calculated. By specifying this planning day, it is possible to distinguish between the plan of the previous manufacturing (production) availability number and the plan of the current manufacturing (production) availability number.

Further, the processing part (301) including the CPU of the production planning system forms a production plan (manufacturing (production) availability number), which indicates when and where each product is produce and how many products are produced, at intervals of months or weeks as shown in FIG. 6, based on the order information (completion request amount) (3033) for each product and the request day, production model information (information of the production line on which each product is produced on each day) (3034), production capacity master information (information of a time required for production of one product for each production process, for each product and on each day) (3035), the yield information for each product, for each production process and on each day (3032), and the working ratio (3038) for each production process and on each day, and provides the planned result through, for example, the communication device 304 to a production control system (309) which performs the supply of parts and the manufacture instruction. That is, with respect to the completion request amount for each product and on a request day in which the order information from the customer is summarized for each product, the production planning system (301) determines, based on the production process information (production model information), the production line on which each product is formed, calculates the production working time necessary for each production line in view of the yield and working ratio, compares the calculated necessary production working time per day in each production process (production line) with the manufacturing(production) tool availability time, and as a result of the comparison, calculates the manufacturing (production) availability number shown in FIG. 6 for the completion request amount shown in FIG. 8, informs the customer of the production plan as a reply through, for example, the communication device (304), and transmits it as the manufacture instruction to the manufacture department and transmits it as the part supply instruction to the material department. Incidentally, in the production planning system (301) according to embodiments of the present invention, it is called the production capacity evaluation that the manufacturing (production) availability number is calculated by comparing the necessary production working time calculated from the completion request amount with the manufacturing(production) tool availability time in which each production line can perform production supply.

In the production capacity evaluation as stated above, in addition to the completion request amount and the manufacturing(production) tool availability time of each production line as stated above, it is necessary to use various input information, such as the yield information collected from the accomplishment collection system (307) or the like, the information indicating the production line of a product provided from a manufacture technician or the like, and the priority of each product given by a production planner. However, there is a case where the input information is changed for reasons of each business. For example, the number of production lines is changed for reasons of a manufacture department, the producible time is changed by the trouble or maintenance of the manufacture apparatus, the yield is lowered due to abrupt reduction in quality, or the production line is changed by design change or manufacture instruction change.

These changes of the input information greatly influence the result of the manufacturing (production) availability number. That is, when the manufacturing (production) unavailability number occurs, in the manufacture department, since persons are scheduled based on, for example, the production planning result of the last week, persons corresponding to the manufacturing (production) unavailability number are wasted. Besides, in the material department, similarly, since parts are purchased by, for example, the production planning result of the last week, parts corresponding to the manufacturing (production) unavailability number are wasted. Besides, to the customer, since the response of the shipment is made based on, for example, the production planning result of the last week, the customer's request can not be kept, and in the worst case, the order chance is lost because of the lowering of the customer service.

In order to prevent the lowering of the profit-due to the occurrence of the manufacturing (production) unavailability number as stated above, in the production planning system (301) according to embodiments of the present invention, after the production capacity is evaluated, in the case where the manufacturing (production) unavailability number occurs, the cause is investigated, and a countermeasure is made. According to the cause, the countermeasure is made in the production planning work, for example, the priority for each product is changed or the working time is changed, and the manufacturing (production) availability number is adjusted, so that the occurrence of the manufacturing (production) unavailability number is prevented.

Next, the functional structure of the production planning system (including a processing program) having the production capacity evaluation function to execute the cause investigating method of the manufacturing (production) unavailability number according to embodiments of the present invention will be described by use of FIG. 1. The production planning system includes the CPU (processing part) (301) having an information collection part (3011) that collects manufacturing (production) availability number information of each product on each day, yield information of each production line on each day, completion request amount information of each product on each day to register order information from the production control system (308), production line information (production process information) defining that each product passes along which production line, production capacity master information registering a time necessary to produce one product on each production line on each day, priority information of each product on each day, manufacturing(production) tool availability time information of each production line on each day, and working ratio information of each line on each day, a manufacturing (production) availability number calculation part (3012) to calculate a manufacturing (production) availability number by using the data of the information collection part (3011), an influence index calculation part (3013) that calculates an influence index by using the data of the information collection part (3011) and the result of the manufacturing (production) availability number calculation part (3012), and a countermeasure planning part (3014) that makes a countermeasure by using the data of the information collection part (3011) and the result of the influence index calculation part (3013).

Further, the storage device (303) includes a manufacturing (production) availability number information (3031) for registration of manufacturing (production) availability number information of each product on a completion scheduled day planned on the planning day as shown in, for example, FIG. 6, the yield information (3032) for calculation of an input amount for each product, each process, and date collected and estimated on the planning day as shown in, for example, FIG. 7, the completion request amount information (3033) for i registration of the order information from the customer or the production control system (309) as shown in, for example, FIG. 8, the production process information (3034) defining that each product passes along which production line as shown in FIG. 9, the production capacity master information (3035) for registration of a unit production capacity time (second/piece) necessary for the production of one product by each production line on the date, which is planned on the planning day as shown in, for example, FIG. 10, a priority information (3036) for registration of priority of each product on a request day, which is planned on the planning day as shown in, for example, FIG. 11, a manufacturing(production) tool availability time information (3037) for registration of a manufacturing(production) tool availability time (second) on the date (request day) on each production line, which is planned on the planning day as shown in, for example, FIG. 12, the working ratio information (3038) on each production line and on the date, which is collected and estimated on the planning day as shown in, for example, FIG. 13, and influence evaluation index information (3039) as the output information of this system as shown in, for example, FIG. 14.

The manufacturing (production) availability number information (3031) shown in FIG. 6 includes a product number, a planning day, a completion scheduled day, and a manufacturing (production) availability number. In this case, the product number is the product number of a final assembled product. These are the output information of the production planning system (production capacity evaluation system) of the invention. The planning day is the day when the manufacturing (production) availability number is calculated. By specifying the planning day, it is possible to distinguish between the plan of the previous manufacturing (production) availability number and the plan of the current manufacturing (production) availability number. In this embodiment, March 1 indicates the previous manufacturing (production) availability number, and March 8 indicates the current manufacturing (production) availability number.

Each record registered in the yield information (3032) shown in FIG. 7 includes fields for registration of the product number as the identification number of the final assembled product, the planning day, the production line, the date (request day), and the yield indicating the ratio of non-defective products on each production line. In the case where the yield is changed according to the date and time, as shown in FIG. 7, the date is included as a field, and the yield may be registered for the date. Besides, the planning day is the day when the manufacturing (production) availability number is calculated. By specifying this planning day, it is possible to distinguish between the plan of the previous manufacturing (production) availability number and the plan of the current manufacturing (production) availability number.

Each record registered in the completion request amount information (3033) shown in FIG. 8 includes a field for registration of the product number as the identification number of the final assembled product, a field for registration of the planning day, a field for registration of the completion request day, and a field for registration of the numerical amount of shipment which must be performed by the request day. Besides, the planning day is the day when the manufacturing (production) availability number is calculated. By specifying this planning day, it is possible to distinguish between the plan of the previous manufacturing (production) availability number and the plan of the current manufacturing (production) availability number.

Each record registered in the production process information (3034) shown in FIG. 9 includes a field for registration of the product number as the identification number of the final assembled product, and a field for registration of the production line along which an assembled product passes before it becomes the final assembled product.

Each record registered in the production capacity master information (3035) shown in FIG. 10 includes a field for registration of the product number as the identification number of the final assembled product, a field for registration of the planning day, a field for registration of the production line, a field for registration of the date (request day), and a field for registration of a unit production capacity time as a time necessary for the line to manufacture one product. Besides, the planning day is the day when the manufacturing (production) availability number is calculated. By specifying this planning day, it is possible to distinguish between the plan of the previous manufacturing (production) availability number and the plan of the current manufacturing (production) availability number.

Each record registered in the priority information (3036) shown in FIG. 11 includes a field for registration of the product number as the identification number of the final assembled product, and fields for registration of the planning day, the request day, and the priority. Besides, the planning day is the day when the manufacturing (production) availability number is calculated. By specifying this planning day, it is possible to distinguish between the plan of the previous manufacturing (production) availability number and the plan of the current manufacturing (production) availability number.

Each record registered in the manufacturing(production) tool availability time information (3037) shown in FIG. 12 includes a field for registration of the production line, a field for registration of the planning day, a field for registration of the date (request day), and a manufacturing(production) tool availability time field for registration of the time in which the line can perform processing (production) per day. Besides, the planning day is the day when the manufacturing (production) availability number is calculated. By specifying this planning day, it is possible to distinguish between the plan of the previous manufacturing (production) availability number and the plan of the current manufacturing (production) availability number.

Each record registered in the working ratio information (3038) shown in FIG. 13 includes a field for registration of the production line, a field for registration of the planning day, a field for registration of the date (request day), and a field for registration of the working ratio on the date. Besides, the planning day is the day when the manufacturing (production) availability number is calculated. By specifying this planning day, it is possible to distinguish between the plan of the previous manufacturing (production) availability number and the plan of the current manufacturing (production) availability number.

As described later in a concrete manner, each record calculated in the influence index calculation part (3013) of the processing part (301) and registered in the influence evaluation index information (3039) shown in FIG. 14 includes a field for registration of the product number, a field for registration of the completion scheduled day, a field for registration of an object parameter, a field for registration of an object product of a parameter as a cause, a field for registration of the production line of the parameter as the cause, a field for registration of the date (request day) of the parameter as the cause, and a field for registration of an influence index on the date.

Figure 23:
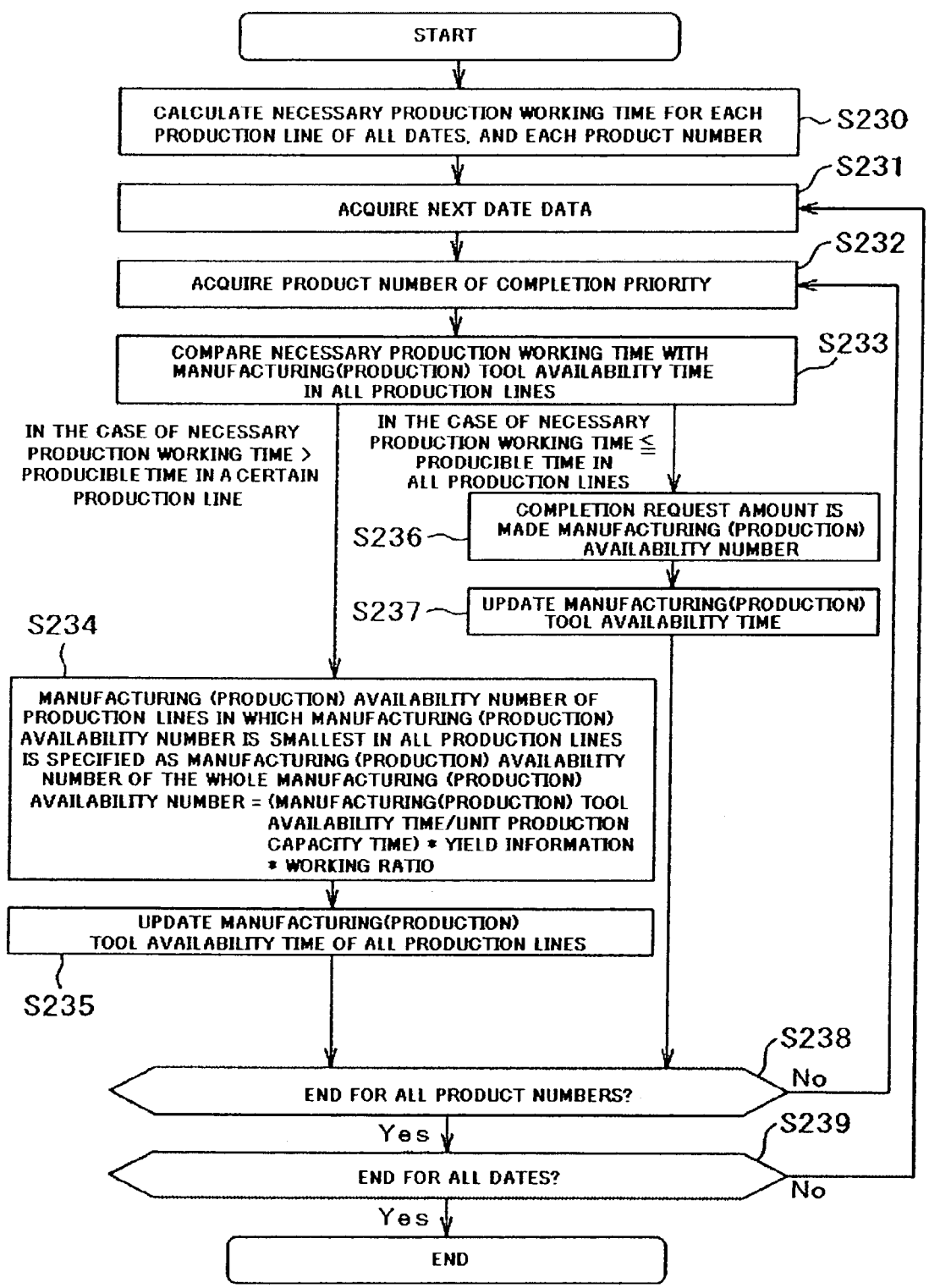
FIG. 23 is a flow view showing an embodiment of a calculation method of a manufacturing (production) availability number calculated by a manufacturing (production) availability number calculation part according to embodiments of the present invention.

Next, the calculation method of the manufacturing (production) availability number to be executed in the manufacturing (production) availability number calculation part (3012) of the processing part (301) will be described by use of FIG. 23. That is, the manufacturing (production) availability number calculation part (3012) of the processing part (301) first calculates a necessary production working time $RT_{aij}$ for each production line (j) and each product number (a) on all dates (request days) on the planning day. When the product is "a", the date (request day) is "i", the production line stored in the production process information (3034) and shown in FIG. 9 is "j", the yield stored in the yield information (3032) and shown in FIG. 7 is $Y_{aij}$, the unit production capacity time stored in the production capacity master information (3035) and shown in FIG. 10 is $K_{aij}$, the completion request number stored in the completion request amount information (3033) and shown in FIG. 8 is $C_{ai}$, and the working ratio stored in the working ratio information (3038) and shown in FIG. 13 is $W_{ij}$, the calculation of the necessary production working time $RT_{aij}$ is expressed by the following expression (2) (S230).

$$RT_{aij} = (C_{ai} \cdot K_{aij}) / (Y_{aij} \cdot W_{ij}) \qquad (2)$$

Next, the manufacturing (production) availability number calculation part (3012) of the processing part (301) acquires the date (request day) data as an object on the planning day as shown in FIG. 11 (S231), and acquires, from the priority information (3036), the priority of the product number in which the completion request amount exists on the date (request day) (S232).

Next, the manufacturing (production) availability number calculation part (3012) of the processing part (301) compares the necessary production working time $RT_{aij}$ calculated for each product number (a) on the planning day, over all production lines (j), and on all dates (request days) with the manufacturing(production) tool availability time $T_{ij}$ stored in the manufacturing(production) tool availability time information (3037) and on all dates (request days) shown in FIG. 12 (S233). On the planning day, as a result of the comparison, in the case of the production impossibility (necessary production working time $RT_{aij}$>manufacturing(production) tool availability time $T_{ij}$) in one or more production lines (in the case where a bottle neck production line exists), the processing part (301) calculates a production-line-specific manufacturing (production) availability number $PN_{aij}$ for each product (a) over all the production lines (j) by the following expression (2), and specifies the smallest production-line-specific manufacturing (production) availability number Min ($PN_{aij}$) among all production lines as a manufacturing (production) availability number $N_{aj}$ of all the production lines (S234).

When the product is "a", the date (request day) is "i", the production line is "j", the yield is $Y_{aij}$, the unit production capacity time is $K_{aij}$, the manufacturing(production) tool availability time is $T_{ij}$, and the working ratio is $W_{ij}$, the calculation of the production-line-specific manufacturing (production) availability number $PN_{aij}$ is expressed by the following expression (3).

$$PN_{aij}=(T_{ij}\cdot W_{ij}\cdot Y_{aij})/K_{aij} \qquad (3)$$

Besides, since the manufacturing (production) availability number $N_{ai}$ specified at this time is the smallest production-line-specific manufacturing (production) availability number Min ($PN_{aij}$) among all the production lines, it is expressed by the calculation expression of the following expression (4) and is decreased.

$$N_{ai}=\text{Min}(PN_{aij}) \; (j=1,2,\ldots,n) \qquad (4)$$

Next, the manufacturing (production) availability number calculation part (3012) of the processing part (301) uses the decreased manufacturing (production) availability number $N_{ai}$ specified on the planning day, and updates the manufacturing(production) tool availability time $T_{ij}$ on all the production lines (j) to the decreased $T'_{ij}$ calculated based on the following expression (5).

$$T'_{ij}=((N_{ai}\cdot K_{aij})/(Y_{aij}\cdot W_{ij})) \qquad (5)$$

Besides, in the manufacturing (production) availability number calculation part (3012) of the processing part (301), on the planning day, as a result of the comparison, in the case of the production possibility (necessary production working time $RT_{aij}$<manufacturing(production) tool availability time $T_{ij}$) in all production lines (in the case where a bottle neck production line does not exist), the production-line-specific manufacturing (production) availability number $PN_{aij}$ is made a completion request number $C_{ai}$ (S236), and the manufacturing(production) tool availability times of all the production lines are updated based on the expression (5) (S237).

The manufacturing (production) availability number calculation part (3012) of the processing part (301) repeats the above processing on the planning day with respect to all production numbers (S238), and repeats it on all dates (request days) (S239).

Next, a specific description will be made by use of FIG. 26 and FIG. 27. That is, FIGS. 26(*a*) and (*b*) show calculation results of the manufacturing (production) availability numbers for the respective processes (respective production lines) of the product B and the product A in which the planning day is March 1, and the date (request day) is April 26. First, the manufacturing (production) availability number calculation part (3012) of the processing part (301) uses the above expression (2), and calculates the necessary production working time $RT_{aij}$ for all products and the respective production lines. Next, the manufacturing (production) availability number calculation part (3012) acquires date (request day) data (April 26 in FIGS. 26(*a*) and (*b*)), and compares the necessary production working time $RT_{aij}$ with the manufacturing(production) tool availability time $T_{ij}$ in order of the priority of the product. In this case, since the priority of the product B is 1 and the priority of the product A is 2, the comparison is made from the product B. As a result of the comparison, since the manufacturing(production) tool availability time is large in all production lines, the manufacturing (production) availability number $PN_{Bij}$ of the product B is made 100 equal to the completion request number $C_{Bi}$. Next, the manufacturing (production) availability number calculation part (3012) uses the expression (5), and updates the manufacturing(production) tool availability time of all production lines of the product B. At this time, the "final assembly 1" line as the line shared with the product A is updated from 175088 seconds to 75088 seconds.

The manufacturing (production) availability number calculation part (3012) compares the necessary production working time $RT_{Aij}$ of all production lines of the product A having the next priority with the manufacturing(production) tool availability time $T_{ij}$. Also in the product A, as a result of the comparison, since the manufacturing (production) availability time is large in all the production lines, the manufacturing (production) availability number $PN_{Aij}$ of the product A is made 100 equal to the completion request number $C_{Ai}$.

Next, FIGS. 27(*a*) and (*b*) show calculation results of the manufacturing (production) availability number of the product B and the product A in which one week has passed, the planning day is March 8 which is the next planning day, and the date (request day) is April 26. First, the manufacturing (production) availability number calculation part (3012) similarly uses the expression (1) to calculate the necessary production working time $RT_{aij}$ for all products and respective production lines. Next, the processing part (301) acquires the date (request day) data (April 26 in FIGS. 27(*a*) and (*b*)), and compares the necessary production working time $RT_{aij}$ with the manufacturing(production) tool availability time $T_{ij}$ in order of the priority of the product. In this case, since the priority of the product B is 1, and the priority of the product A is 2, the comparison is made from the product B. As a result of the comparison, since the manufacturing (production) tool availability time is large in all the production lines, the manufacturing (production) availability number $PN_{Bij}$ of the product B is made 100 equal to the completion request number $C_{Bi}$. Next, the manufacturing (production) availability number calculation part (3012) uses the expression (5) to update the manufacturing(production) tool availability time of all the lines of the product B. At this time, the "final assembly 1" line as the line shared with the product A is updated from 175088 seconds to 70558 seconds.

Then, the manufacturing (production) availability number calculation part (3012) compares the necessary production working time $RT_{Aij}$ of all the production lines of the product A having the next priority with the manufacturing(production) tool availability time $T_{ij}$. At this time, in the product A, as a result of the comparison, the necessary production working time of the "final assembly 1" line is larger than the manufacturing(production) tool availability time. Then, by using the expression (3), the production-line-specific manufacturing (production) availability number $PN_{Aij}$ of the product A is calculated to obtain 90. Next, by using the expression (4), 90 as the minimum value Min($PN_{Aij}$) of the production-line-specific manufacturing (production) availability number is made the manufacturing (production) availability number of the product A.

Next, the processing flow of a cause investigating method of the manufacturing (production) unavailability number according to the invention will be described by use of FIG. 5. In accordance with embodiments of the present invention, in order to first investigate the cause of the manufacturing (production) unavailability number in the production capacity evaluation, the influence index calculation part (3013) of the processing part (301) compares the previous manufacturing (production) availability number with the current manufacturing (production) availability number for each product and each completion scheduled day, and the production line used in the manufacturing (production) availability number in which the change occurs is extracted as the object production line of the manufacturing (production) unavailability number (S101).

Figure 15:
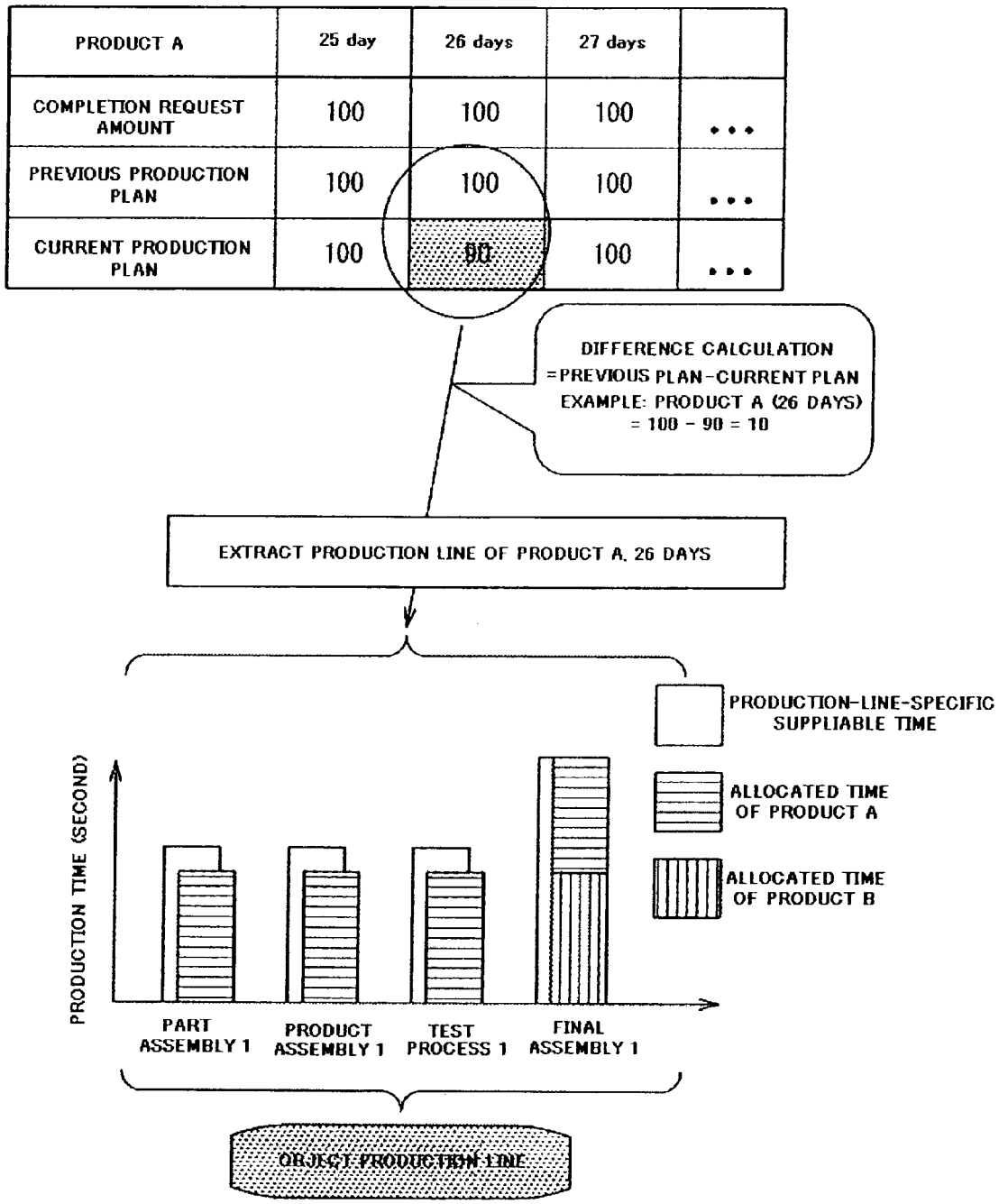
FIG. 15 is an explanatory view of a step of extracting an object production line of a manufacturing (production) unavailability number according to embodiments of the present invention.

Specifically, as shown in FIG. 15, first, difference calculation of the manufacturing (production) availability number at the time of the previous planning and the manufacturing (production) availability number at the time of the current planning is performed for each date (request day), and the product name on the date where a change occurs and the date are acquired. Besides, a case where a change exists according to the difference calculation is defined as the manufacturing (production) unavailability number. In this embodiment, the product A, 26 days, and the difference of 10 are acquired. Next, from these information (product A, 26 days, difference of 10) and the production process (production line) information, the production line used for the calculation of the manufacturing (production) unavailability number of the product A and 26 days is extracted, and is made an object production line of the manufacturing (production) unavailability number. All production lines used when the product is manufactured are recited in the production process information.

Figure 16:
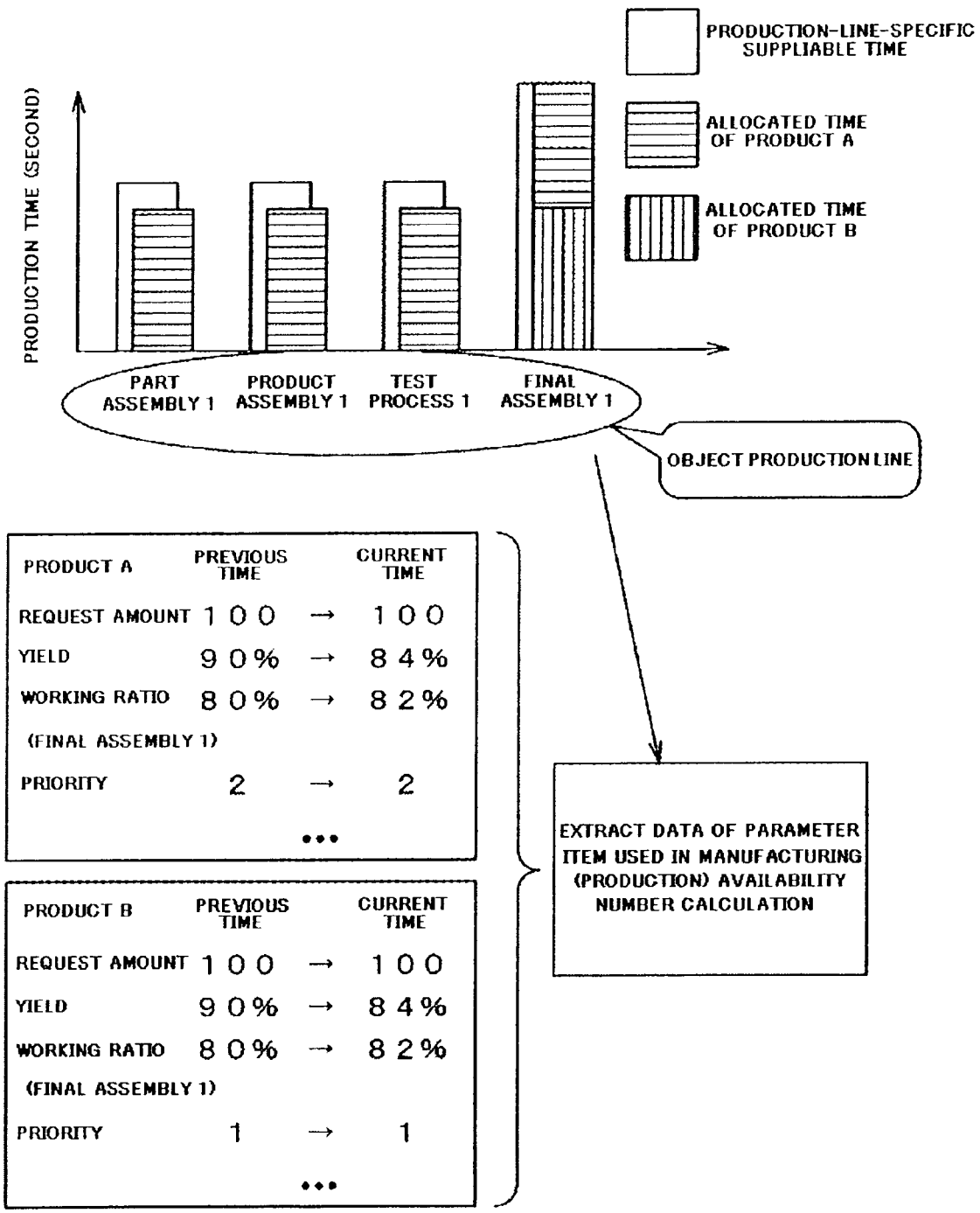
FIG. 16 is an explanatory view of a step of extracting data (value) of a parameter item used in production capacity evaluation according to embodiments of the present invention.

Next, the influence index calculation part (3013) of the processing part (301) extracts data (product-specific completion request amount information $C_{ai}$, product-specific production capacity master information (unit production capacity time information) $K_{aij}$, product-specific yield information $Y_{aij}$, manufacturing (production) tool availability time information $T_{ij}$, working ratio information $W_{ij}$, priority information, etc.) of all parameter items used in the manufacturing (production) availability number calculation from the production line as the object of the manufacturing (production) unavailability number (S102). Specifically, an example is shown in FIG. 16. First, the influence index calculation part (3013) of the processing part (301) extracts all products using the object production line extracted at (S101) by using the production process information. In this embodiment, there are extracted data, such as the yield, working ratio and priority, as parameter items used in the manufacturing (production) availability number calculation of four production lines (part assembly 1, product assembly 1, test process 1, final assembly 1) as the object production line of the product A. The parameter items used in the manufacturing (production) availability number calculation is previously registered. Besides, since the final assembly 1 is the production line common to the product A and the product B, all parameter items used in the manufacturing (production) availability number calculation of the product B are extracted simultaneously with the product A. That is, in this embodiment, the completion request amount, the yield, the working ratio, the priority, the unit production capacity time, the manufacturing (production) tool availability time and the like, which are data of the parameter items used for 26 days of the product A and the product B, are extracted.

Figure 17:
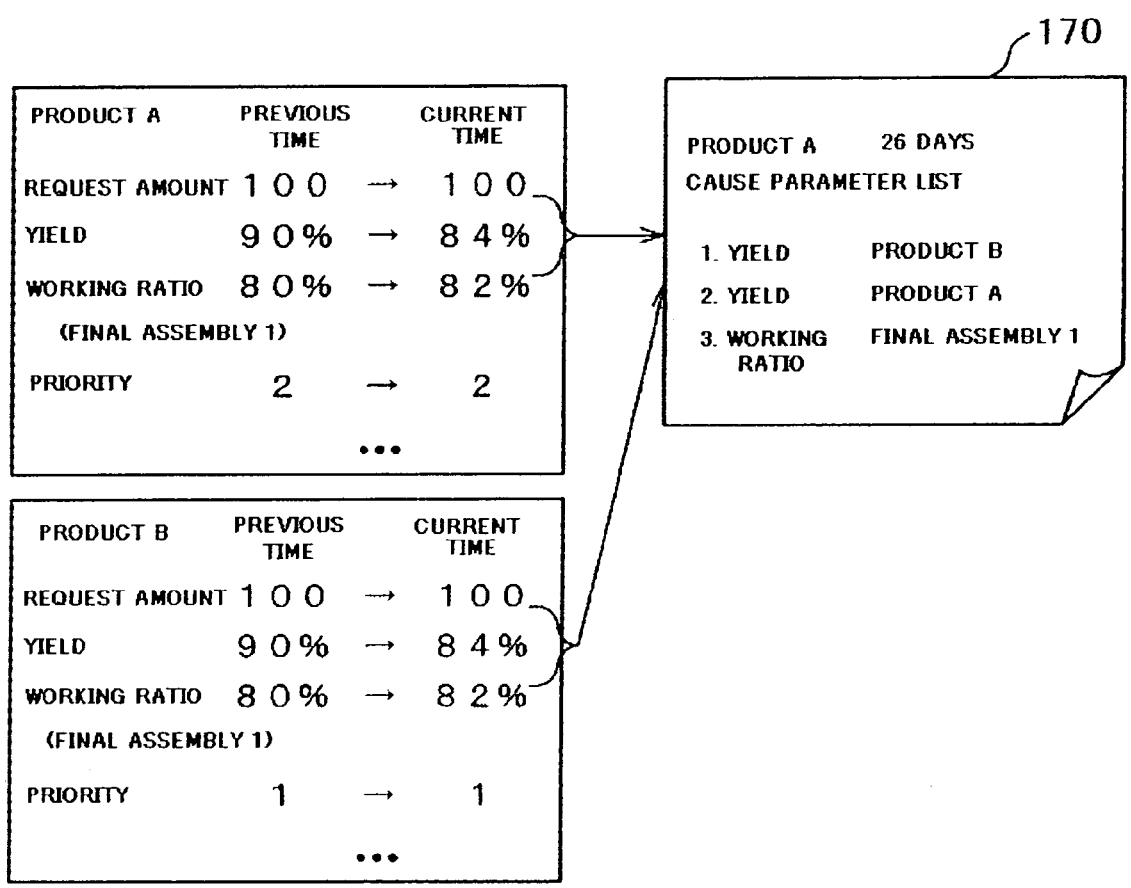
FIG. 17 is an explanatory view of a cause parameter list in which a parameter item as a cause of a manufacturing (production) unavailability number for a product A and 26 days is specified according to embodiments of the present invention.

Next, the influence index calculation part (3013) of the processing part (301) calculates the difference of the values (data) of the parameter items used in the calculation of the previous manufacturing (production) availability number and the current manufacturing (production) availability number, and specifies the parameter items as the cause (S103). At this time, a combination of the parameter items as the cause is calculated, and is made a cause parameter list (170). Specifically, as shown in FIG. 17, with respect to the values of the parameter items of the product A and the product B, the difference comparison is sequentially performed between the previous time and the current time. In the case of this embodiment, since the yield of the product B is changed from 90% to 84%, the yield of the product A is changed from 90% to 84%, and the working ratio of the "final assembly 1" is changed from 80% to 82%, they are specified as the parameter items which become the cause of the manufacturing (production) unavailability number, and the cause parameter list (170) is created.

Next, from the specified cause parameter list (170), the influence index calculation part (3013) or the manufacturing (production) availability number calculation part (3012) of the processing part (301) changes the parameter items sequentially to the current values (input data), and with respect to the remaining parameter items, the previous values (input data) are used, and the manufacturing (production) availability number is recalculated (S104). At this time, the influence index calculation part (3013) calculates the influence index k given to the manufacturing (production) unavailability number by the cause parameter item based on the following expression (6) (S105). The influence index calculation part (3013) of the processing part (301) displays the calculated influence index k on the display device as the output device 306 and can present it to the production plan planner. Besides, based on the displayed influence index k, the production plan planner uses the input device 305 to take countermeasures such as the change of the value (input data) of the parameter item and can form the production plan again.

$$\text{influence index } k = (\text{previous manufacturing (production) availability number} - \text{manufacturing (production) availability number } k)/(\text{previous manufacturing (production) availability number} - \text{current manufacturing (production) availability number}) \quad (6)$$

(where, k denotes an argument of the cause parameter list)

The influence index k calculated in the expression (6) indicates, by the ratio, the influence when the cause parameter item is changed from the previous one to the current one with respect to the denominator (difference between the previous and the current manufacturing (production) availability numbers). In the case where this value is large, it is indicated that the cause parameter item has a large influence on the manufacturing (production) unavailability number. In the case where the value becomes a negative value, this means that with respect to the cause parameter item, the manufacturing (production) availability number larger than the previous manufacturing (production) availability number is calculated. That is, the production plan planner displays this influence index on the display device 306, and can quantitatively grasp the parameter having an influence on the manufacturing (production) unavailability number. Besides, the production plan planner takes countermeasures, such as the change of input information, based on this influence index, and can form the production plan again.

Figure 18:
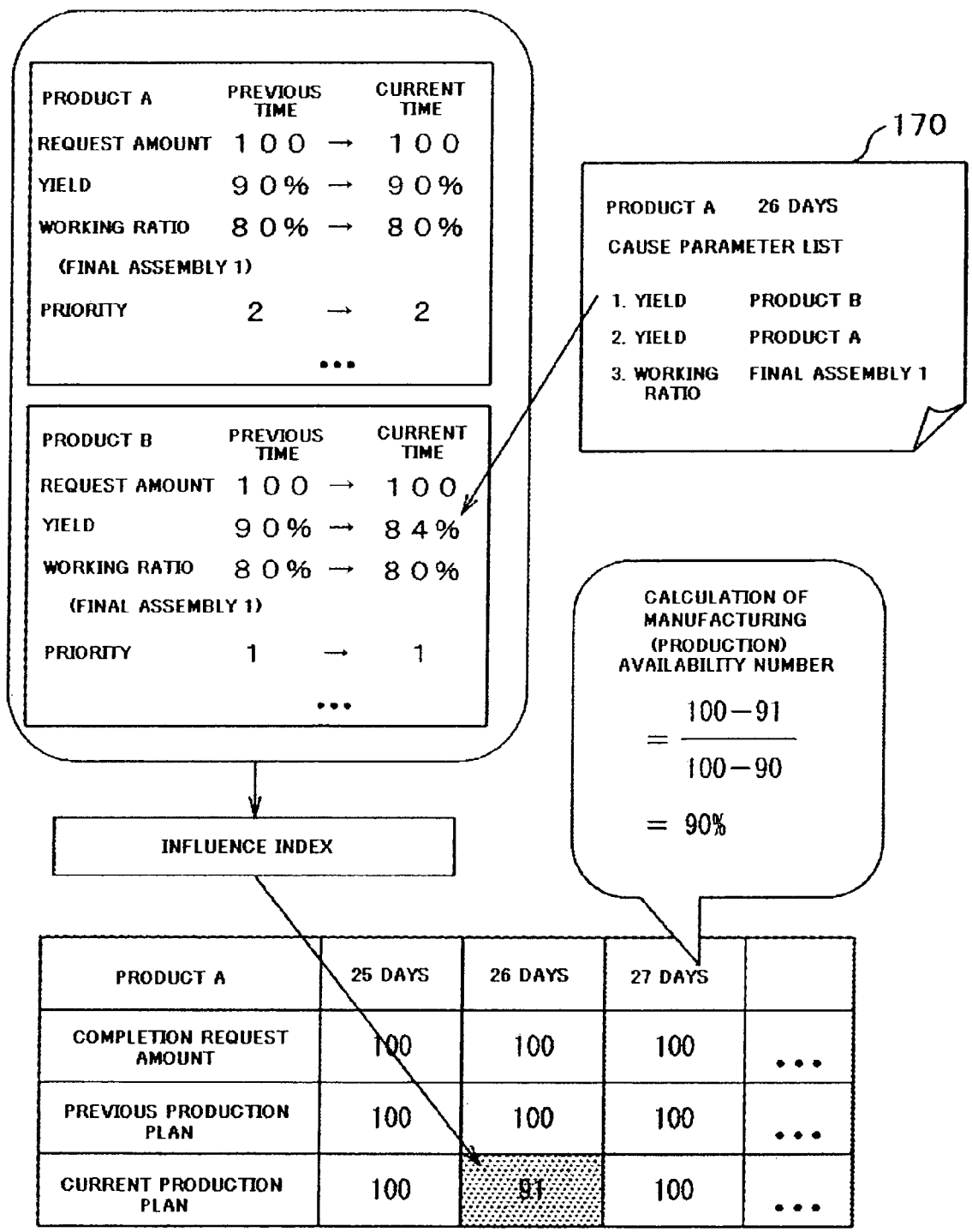
FIG. 18 is an explanatory view of a relation between a calculation result (91) of a manufacturing (production) availability number recalculated such that only the current yield of a product B in a specified product A of 26 days in the cause parameter list according to embodiments of the present invention is changed to 84%, and the values of other parameters are the previous values, and its influence index (90%).

Specifically, as shown in FIG. 18, one parameter item is specified from the cause parameter list (170) displayed on the display device 306, and the influence index calculation part (3013) extracts it. In the case of this embodiment, the yield of the product B is extracted. Next, the influence index calculation part (3013) or the manufacturing (production) availability number calculation part (3012) recalculates the manufacturing (production) availability number with the values of the previous parameters other than the yield of the product B, and with the current value (84%) with respect to the yield of the product B. Specifically, as shown in FIG. 30 and FIG. 31, the necessary production working time of the "final assembly 1" line of the product B of the priority "1" becomes 107143 seconds, and the remaining suppliable time becomes 67945 seconds, and accordingly, the suppliable time of the "final assembly 1" line of the product A of the priority "2" becomes 67945 seconds, the remaining suppliable time becomes −7055 seconds, and the manufacturing (production) availability number in the "final assembly 1" line becomes 91 from the relation of the expression (3). Then, the influence index calculation part (3013) calculates the influence index k by using the expression (5) from the obtained manufacturing (production) availability number, and 90% is obtained as shown in FIG. 18.

Figure 19:
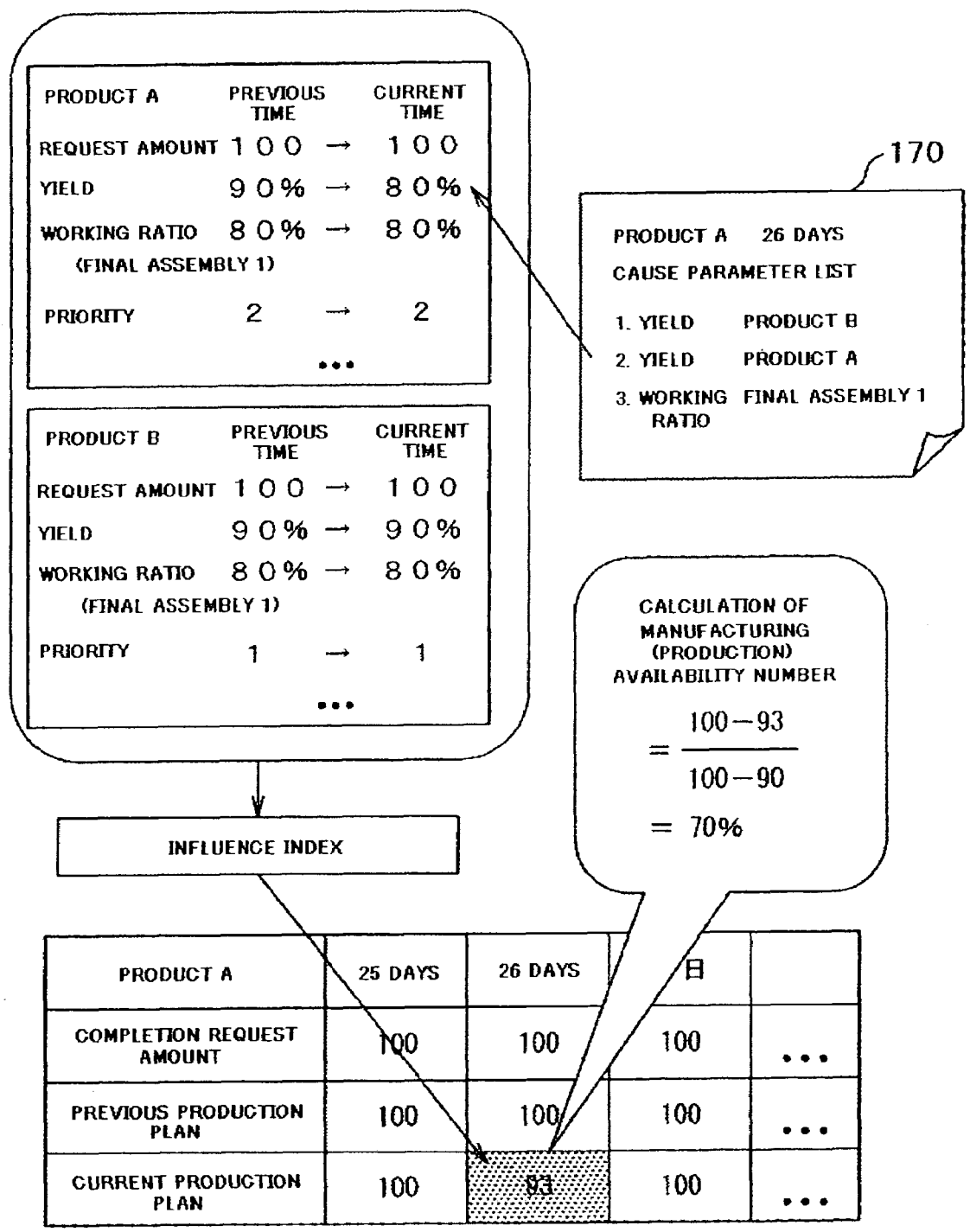
FIG. 19 is an explanatory view of a relation between a calculation result (93) of a manufacturing (production) availability number recalculated such that only the current yield of a product A in a specified product A of 26 days in the cause parameter list according to embodiments of the present invention is changed to 80%, and the values of other parameters are the previous values, and its influence index (70%).

Next, as shown in FIG. 19 displayed on the display device 306, the yield of the product A as the next parameter item of the cause parameter list (170) is specified, and the influence index calculation part (3013) extracts it. Then, the influence index calculation part (3013) or the manufacturing (production) availability number calculation part (3012) recalculates the manufacturing (production) availability number with, as shown in FIG. 19, the previous parameter values with respect to the parameter items other than the yield of the product A, and with the current value (80%) with respect to the yield of the product A. Specifically, as shown in FIGS. 29(a), (b), the necessary production working time of the "final assembly 1" line of the product B of the priority "1" becomes 175088 seconds, and the remaining suppliable time becomes 75088 seconds, and accordingly, the suppliable time of the "final assembly 1" line of the product A of the priority "2" becomes 75088 seconds, the remaining suppliable time becomes −5269 seconds, and the manufacturing (production) availability number in the "final assembly 1" line becomes 93. The influence index calculation part (3013) calculates the influence index k by using the expression (6) from the obtained manufacturing (production) availability number, and 70% is obtained as shown in FIG. 19.

Figure 20:
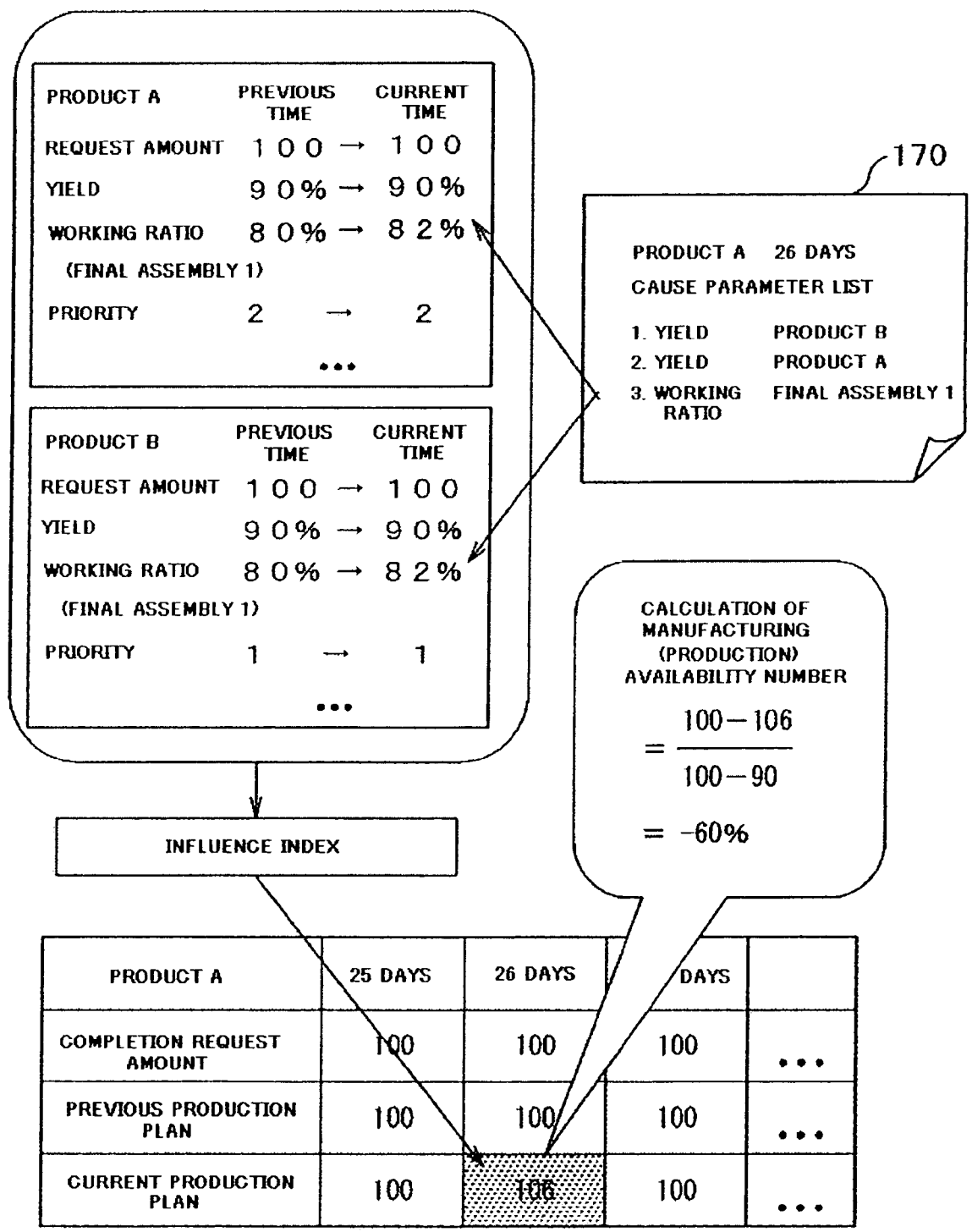
FIG. 20 is an explanatory view of a relation between a calculation result (106) of a manufacturing (production) availability number recalculated such that only the current working ratio of the "final assembly 1" in a specified product A of 26 days in the cause parameter list according to embodiments of the present invention is changed to 82%, and the values of other parameters are the previous values, and its influence index (−60%).

Next, as shown in FIG. 20 displayed on the display device 306, the working ratio of the "final assembly 1" line as, for example, the next final parameter in the cause parameter list (170) is specified and the influence index calculation part extracts it (3013). Then, the influence index calculation part (3013) or the manufacturing (production) availability number calculation part (3012) recalculates the manufacturing (production) availability number with, as shown in FIG. 20, the previous parameter values with respect to the parameter items other than the working ratio of the "final assembly 1" line and with the current value (82%) with respect to the working ratio of the product A. Specifically, as shown in FIGS. 30(a) and (b), the necessary production working time of the "final assembly 1" line of the product B of the priority "1" becomes 97561 seconds, and the remaining suppliable time becomes 77527 seconds, and accordingly, the suppliable time of the "final assembly 1" line of the product A of the priority "2" becomes 77527 seconds, the remaining suppliable time becomes 4356 seconds, and the manufacturing (production) availability number in the "final assembly 1" line becomes 106 from the relation of the expression (2). Then, the influence index calculation part (3013) calculates the influence index k by using the expression (5) from the obtained manufacturing (production) availability number, and −60% is obtained as shown in FIG. 20.

As described above, as shown in FIG. 5, in the step S106, the steps S104 and S105 are repeated over all cause parameters listed in the cause parameter list (170), and the influence index calculation part (3013) calculates the influence index of each of all the cause parameter items.

Figure 5:
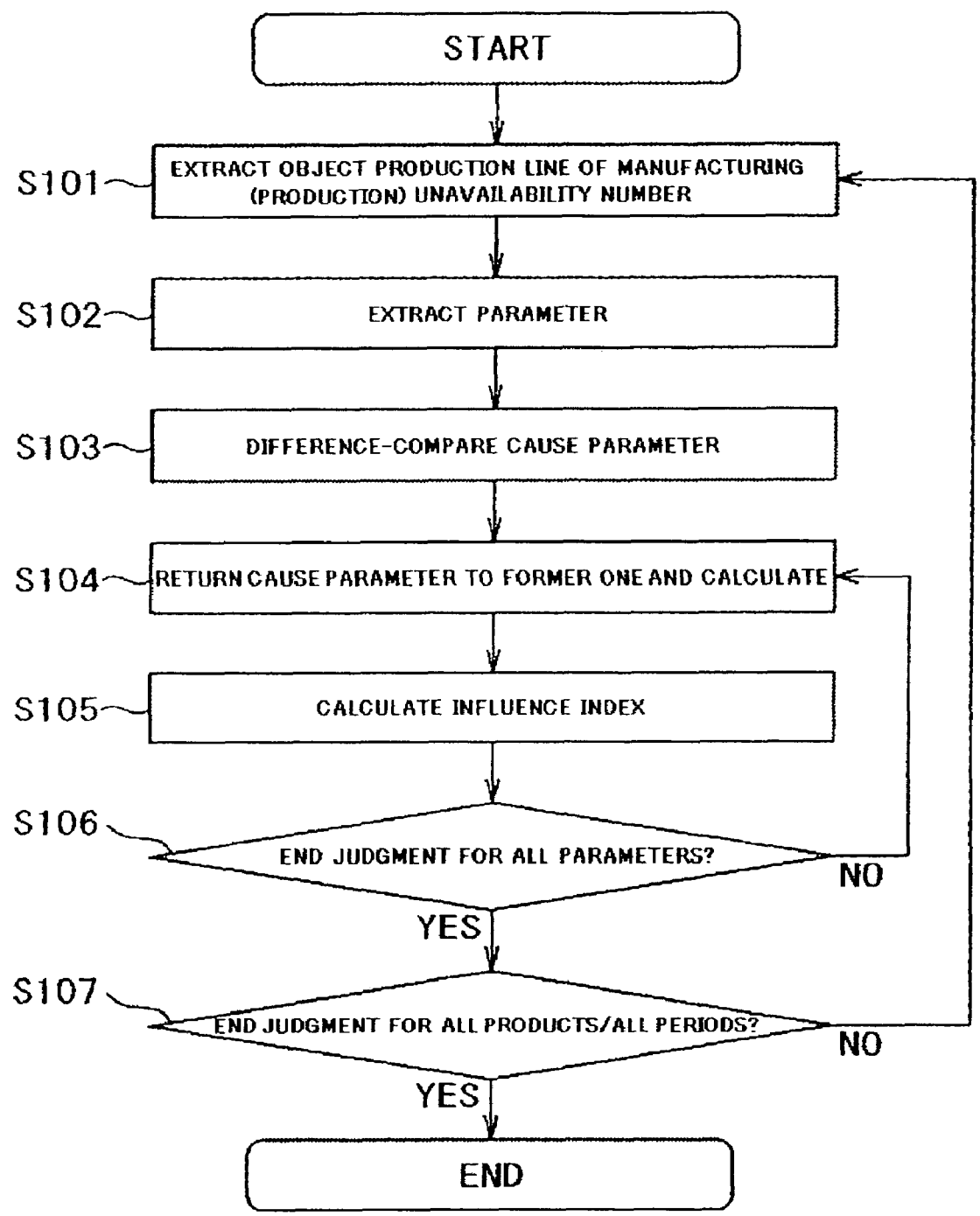
FIG. 5 is an operation flow view showing an embodiment of the cause investigating method of the manufacturing (production) unavailability number according to the present invention.

Further, as shown in FIG. 5, in the step S107, the steps S101 to S106 are repeated for all products and all periods. After all calculations are ended, the influence index calculation part (3013) of the processing part (301) can finally acquire the influence index list as shown in FIG. 21, and it can be displayed on the display device (306) and can be outputted. In this embodiment, the yield of the product B, the yield of the product A, and the influence index to the working ratio of the product A are respectively displayed to be 90%, 70% and −60%.

Figure 22:
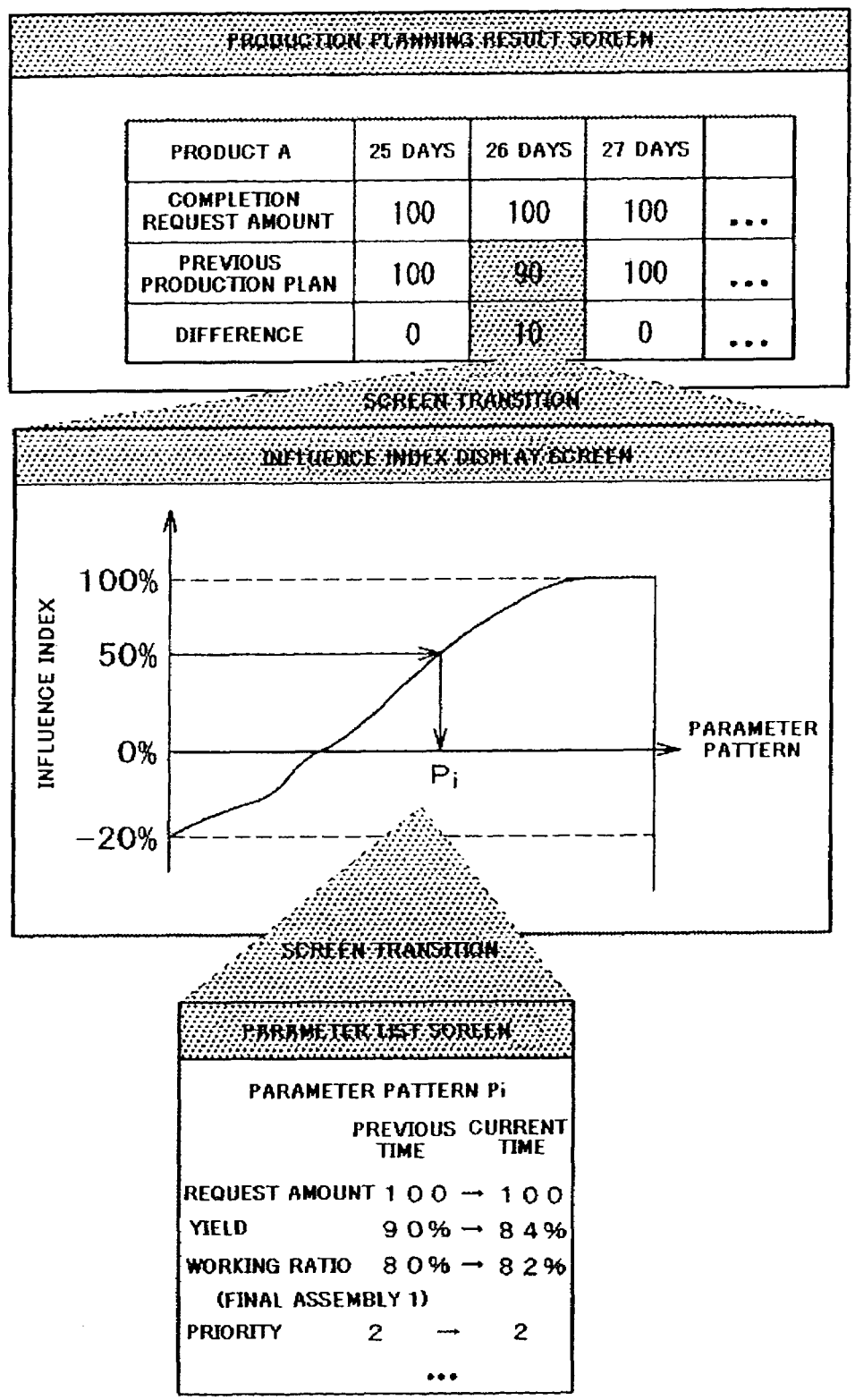
FIG. 22 is a view showing an embodiment of a screen of an influence index calculated in an influence index calculation part according to the invention.

FIG. 22 is a view showing an embodiment of a screen display of an influence index displayed on the display device (306). The completion request amount of each product and the difference between the current plan and the previous plan are displayed on the production plan screen. From that, for example, by the input of the input device (305), the screen transition occurs to the influence index display screen. On the influence index display screen, the horizontal axis indicates the parameter pattern (transition of the value of the parameter between the previous time and the current time) Pi for each product, and the vertical axis indicates the influence index, and they are shown by a graph or a list. From that, for example, by the input of the input device (305), the screen transition occurs to the parameter list screen. On the parameter list screen, the parameter pattern Pi displayed on the influence index calculation part screen is displayed. In this embodiment, it is understood that the values of the yield, the working ratio, the priority and the like are changed from the previous ones to the current ones, or remain as they are.

As described above, according to embodiments of the present invention, the planning of the production plan, the comparison work between the previous/current plans and the number of times of correction can be decreased as compared with the related art, and the production plan with high precision can be prepared in a short time.

Next, an embodiment of a countermeasure planning method using the influence evaluation index to be executed in the countermeasure planning part (3014) of the processing part (301) of the invention will be described by use of FIG. 24. That is, in order to prevent the reduction in profit due to the occurrence of the manufacturing (production) unavailability number, in the production planning work, after the evaluation of the production capacity, in the case where the manufacturing (production) unavailability number occurs, the cause parameter item is investigated, and the countermeasure is made. From the cause parameter items, the countermeasure, such as the priority change of each product or the change of working time, is made in the production planning work, and the manufacturing (production) availability number is adjusted, so that the occurrence of the manufacturing (production) unavailability number is prevented. The countermeasure planning part (3014) of the processing part (301) first performs the difference calculation between the manufacturing (production) availability number at the time of the previous planning and the manufacturing (production) availability number at the time of the current planning for each date (request day) based on the manufacturing (production) availability number information (3031) of the storage device (303), and confirms the presence/absence of the manufacturing (production) unavailability number as the presence/absence of the change. When the manufacturing (production) unavailability number exists, the countermeasure planning part (3014) confirms the presence/absence of the product sharing the manufacture apparatus on the production line like, for example, the "final assembly 1" based on the influence evaluation index information (3039) of the storage device (303) (S241). For example, in the case of FIG. 14, with respect to the data of the product A and the date (request day) of April 26, the presence/absence of the product name other than the product A is confirmed in the cause product number (S242). This case, since the product B exists, is such a case that there is a product sharing the manufacture apparatus. Next, the countermeasure planning part (3014) proceeds to the priority countermeasure processing (S243). In the priority countermeasure processing, based on the priority information (3036) of the storage device (303), the priority of the relevant product is compared with that of the other product, and in the case where the priority of the other product exceeds the priority of the relevant product, the countermeasure instruction is issued to change the priority. For example, as shown in FIG. 11, in the case where the priority of the product A of the date (request day) of April 26 is 2, and the priority of the product B is 1, since the priority of the product B as the other product exceeds that of the product A as the relevant product, the countermeasure instruction is issued so that the priority of the product B becomes lower than the priority of the product A. Specifically, as shown in FIG. 25, as the priority countermeasure, the countermeasure instruction is issued so that the priority of the product B of the date of April 26 is changed from 1 to 2 (S243).

Next, the countermeasure planning part (3014) proceeds to the countermeasure processing of the completion request amount (S244). In the countermeasure processing of the completion request amount, the countermeasure is issued to change the completion request amount of the product which shares the manufacture apparatus with the relevant product. The change calculation of the completion request amount is as follows. When the relevant product is A, the product sharing the manufacture apparatus is B, the date is I, and the production line sharing the manufacture apparatus is J, and when a manufacturing (production) unavailability number obtained from the manufacturing (production) availability number information is $N_{AI}$ (3031), the yields obtained from the yield information (3032) are $Y_{AIJ}$ and $Y_{BIJ}$, the unit production capacity times obtained from the production capacity master information (3035) are $K_{AIJ}$ and $K_{BIJ}$, and the completion request number of the product B sharing the manufacture apparatus obtained from the completion request amount information (3033) is $C_{BI}$, the completion request number New $C_{BI}$ after the change is expressed by the expression (7).

$$\text{New } C_{BI}=C_{BI}-(N_{AI}(K_{AIJ}Y_{BIJ})/(Y_{AIJ}K_{BIJ})) \tag{7}$$

Figures 24, 25:
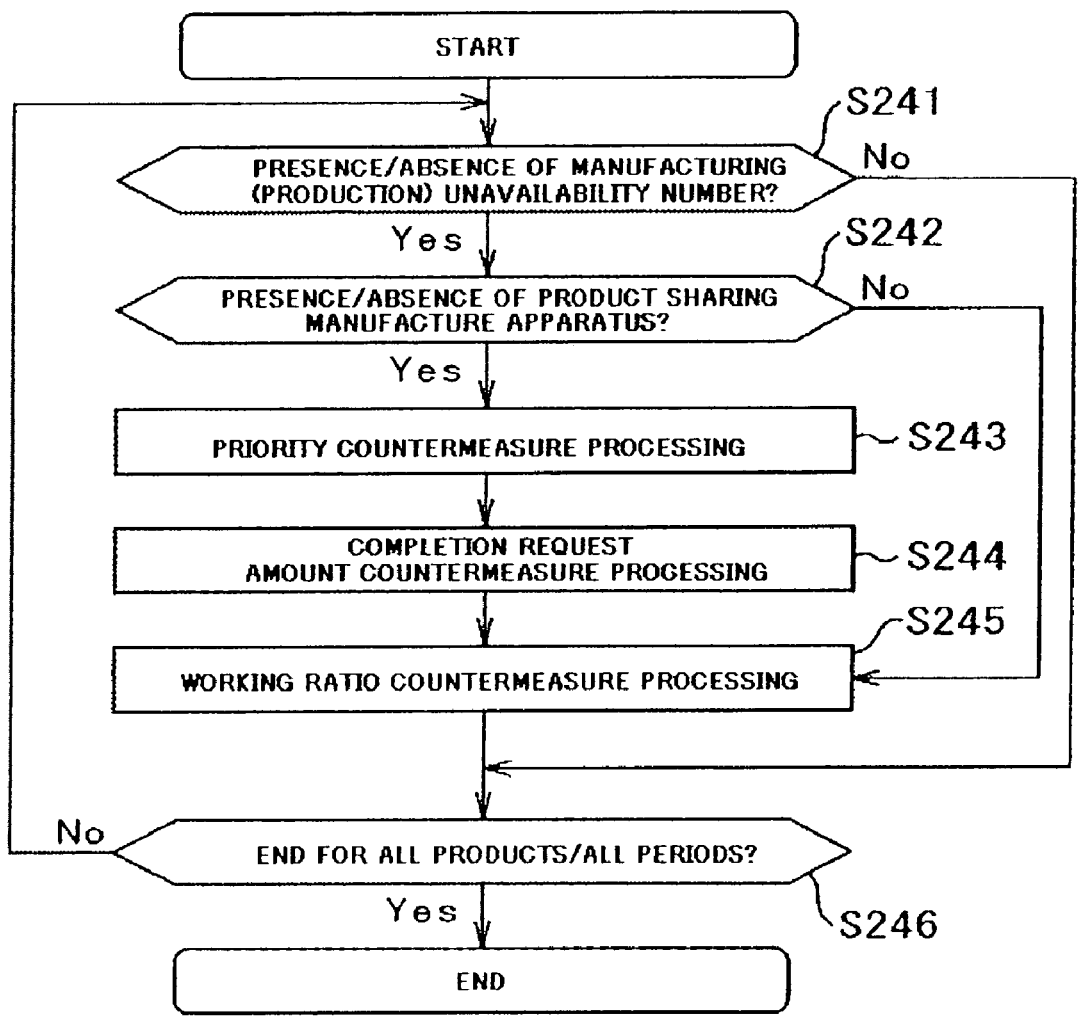
FIG. 24 is a view showing a processing flow of a countermeasure method executed in a countermeasure planning part according to embodiments of the present invention.
FIG. 25 is a view showing an embodiment of a display of a countermeasure method according to the present invention.

Specifically, as shown in FIG. 25, the countermeasure planning part (3014) issues the countermeasure instruction to change the completion request amount of the product B of the date of April 26 from 100 to 92 as the completion request amount countermeasure.

Next, the countermeasure planning part (3014) proceeds to the countermeasure processing of the working ratio (S245). In the countermeasure processing of the working ratio, it is confirmed whether the working ratio is registered as the cause parameter in the influence evaluation index information obtained from the influence evaluation index information (3039) of the storage device (303). When it is registered, the countermeasure processing of the working ratio is performed by the following expression (8) (S245). When the relevant product is A, the date is I, and the production line of the manufacturing (production) unavailability number is J, and when the manufacturing (production) unavailability number obtained from the manufacturing (production) availability number information is $N_{AI}$ (3031), the unit production capacity time obtained from the production capacity master information (3035) is $K_{AIJ}$, the working ratio of the production line of the manufacturing (production) unavailability number obtained from the working ratio information (3038) is $W_{IJ}$, and the manufacturing (production) tool availability time obtained from the manufacturing (production) tool availability time information (3037) is $T_{IJ}$, the working ratio New $W_{IJ}$ after the change is expressed by the following expression (8).

$$\text{New } W_{IJ}=W_{IJ}+(N_{AI}(K_{AIJ}/T_{IJ})) \tag{8}$$

Specifically, as shown in FIG. 25, as the working ratio countermeasure, the countermeasure instruction is issued to change the working ratio of the "final assembly process 1" of the date of April 26 from 82% to 96%.

In step S246, the countermeasure planning part (3014) repeats the above processing for all product numbers and repeats it for all dates.

What is claimed is:

1. A production planning method for extracting a cause parameter item of a manufacturing production unavailability number by using production capacity evaluation calculation, characterized by comprising:

a production capacity evaluation step of calculating on a computer, a previous manufacturing production availability number of a previous production plan and a current manufacturing production availability number of a current production plan by using a production capacity evaluation calculation for a request day and a product;

a target production line extraction step of extracting using the computer, a target production line to be used in a production plan of a product in which a change occurs by comparing the previous manufacturing production availability number with the current manufacturing production availability number for each request day and each product calculated at the production capacity evaluation step;

a parameter item extraction step of extracting using the computer, from the production line extracted at the target production line extraction step, a parameter item to be used in the production capacity evaluation calculation with respect to all products;

a cause parameter list creation step of specifying at least one of the parameter items as a cause of a change by difference-comparing data at a time of previous production planning with data at a time of current production planning for each parameter item extracted at the parameter item extraction step and listing the specified cause parameter item, where k denotes an argument of a cause parameter list;

a recalculation step of recalculating using the computer, a manufacturing production availability number k for each of the specified cause parameter items by using the production capacity evaluation calculation and by, based on the cause parameter list created at the cause parameter list creation step, sequentially changing cause parameter items other than the specified cause parameter item to data at the time of the previous production planning and inputting data at the time of the current production planning with respect to the specified cause parameter item;

an influence index calculation step of calculating using the computer, an influence index k given to the manufacturing production unavailability number by the specified cause parameter item k based on a following expression and based on the manufacturing production availability number k of each of the specified cause parameter items recalculated at the recalculation step:

influence index $k$=(previous manufacturing production availability number −manufacturing production availability number $k$)/(previous manufacturing production availability number−current manufacturing production availability number);

and displaying the calculated influence index k on a display device.

2. The production planning method according to claim 1, characterized by comprising a countermeasure planning step of making a countermeasure by correcting the data at the time of the current production planning with respect to the specified cause parameter item having a large influence index k relative to influence indexes k calculated at the influence index calculation step.

3. The production planning method according to claim 1, characterized in that at the production capacity evaluation step, the previous manufacturing production availability number and the current manufacturing production availability number calculated for each request day and each product are displayed on a display device.

4. The production planning method according to claim 1, characterized in that at the cause parameter list creation step, the listed and specified cause parameter item is displayed on a display device.

5. A production planning system for extracting a cause parameter item of a manufacturing production unavailability number by using production capacity evaluation calculation, comprising a computer having:

production capacity evaluation means for calculating a previous manufacturing production availability number of a previous production plan and a current manufacturing production availability number of a current production plan by using the production capacity evaluation calculation for each request day and each product;

object production line extraction means for extracting a production line of an object to be used in a production plan of a product in which a change occurs by comparing the previous manufacturing production availability number with the current manufacturing production availability number for a request day and a product calculated by the production capacity evaluation means;

parameter item extraction means for extracting, from the production line extracted by the target production line extraction means, a parameter item to be used in the production capacity evaluation calculation with respect to all products;

cause parameter list creation means for specifying at least one of the parameter items as a cause of a change by difference-comparing data at a time of previous production planning with data at a time of current production planning for each parameter item extracted by the parameter item extraction means and listing the specified cause parameter item, where k denotes an argument of the cause parameter list;

recalculation means for recalculating a manufacturing production availability number k for each of the specified cause parameter items by using the production capacity evaluation calculation and by, based on the cause parameter list created by the cause parameter list creation means, sequentially changing the cause parameter items other than the specified cause parameter item to data at the time of the previous production planning and inputting data at the time of the current production planning with respect to the specified cause parameter item;

influence index calculation means for calculating an influence index k given to the manufacturing production unavailability number by the specified cause parameter item k based on a following expression and based on the manufacturing production availability number k of each of the specified cause parameter items recalculated by the recalculation means:

influence index $k$=(previous manufacturing production availability number −manufacturing production availability number $k$)/(previous manufacturing production availability number−current manufacturing production availability number);

and displaying the calculated index k on a display device.

6. The production planning system according to claim 5, characterized by comprising countermeasure planning means for making a countermeasure by correcting the data at the time of the current production planning with respect to the specified cause parameter item having a large influence index k relative to influence indexes k calculated by the influence index calculation means.

7. The production planning system according to claim 5, characterized in that in the production capacity evaluation means, the previous manufacturing production availability number and the current manufacturing production availability number calculated for each request day and each product are displayed on a display device.

8. The production planning system according to claim 5, characterized in that in the cause parameter list creation means, the listed and specified cause parameter item is displayed on a display device.

9. The production planning method according to claim 2, characterized in that at the production capacity evaluation step, the previous manufacturing production availability number and the current manufacturing production availability number calculated for each request day and each product are displayed on a display device.

10. The production planning method according to claim 2, characterized in that at the cause parameter list creation step, the listed and specified cause parameter item is displayed on a display device.

11. The production planning system according to claim 6, characterized in that in the production capacity evaluation means, the previous manufacturing production availability number and the current manufacturing production availability number calculated for each request day and each product are displayed on a display device.

12. The production planning system according to claim 6, characterized in that in the cause parameter list creation means, the listed and specified cause parameter item is displayed on a display device.

* * * * *